(12) United States Patent
Anderson

(10) Patent No.: US 8,234,752 B2
(45) Date of Patent: Aug. 7, 2012

(54) SLIDING AND ROTATING HINGE MODULE

(75) Inventor: Glenn E. Anderson, Malvern, PA (US)

(73) Assignee: Southco, Inc., Concordville, PA (US)

( * ) Notice: Subject to any disclaimer, the term of this patent is extended or adjusted under 35 U.S.C. 154(b) by 594 days.

(21) Appl. No.: 12/035,303

(22) Filed: Feb. 21, 2008

(65) Prior Publication Data

US 2008/0196201 A1    Aug. 21, 2008

Related U.S. Application Data

(60) Provisional application No. 60/891,039, filed on Feb. 21, 2007.

(51) Int. Cl.
E05D 7/06 (2006.01)

(52) U.S. Cl. ........................................ 16/239

(58) Field of Classification Search .................... 16/362, 16/286.1, 352, 345, 327, 319, 86.2, 231, 16/232, 239, 96 R; 248/286.1, 298.1, 292.13, 248/920; 108/140, 142, 143; 312/9.1, 9.3, 312/9.9, 9.14, 323, 311, 9.48, 9.53; 267/158, 267/160; 188/74, 77 R, 82.1
See application file for complete search history.

(56) References Cited

U.S. PATENT DOCUMENTS

| | | | |
|---|---|---|---|
| 2,710,782 A | 6/1955 | Chaft | |
| 4,607,884 A | 8/1986 | Heling | |
| 4,625,657 A | 12/1986 | Little et al. | |
| 4,764,075 A | 8/1988 | Cox et al. | |
| 4,778,228 A * | 10/1988 | Ackeret | 312/9.43 |
| 4,796,733 A * | 1/1989 | Nakayama | 188/291 |
| 4,836,482 A | 6/1989 | Sokol | |
| 5,199,777 A | 4/1993 | Taima et al. | |
| 5,257,767 A | 11/1993 | McConnell | |
| 5,487,525 A | 1/1996 | Drabczyk et al. | |
| 5,697,303 A | 12/1997 | Allan | |
| 5,847,685 A | 12/1998 | Otsuki | |
| 5,881,984 A | 3/1999 | Lin | |
| 6,125,030 A | 9/2000 | Mola et al. | |
| 6,186,460 B1 | 2/2001 | Lin | |
| 6,270,047 B1 | 8/2001 | Hudson | |
| 6,464,089 B1 * | 10/2002 | Rankin, VI | 211/59.3 |

(Continued)

FOREIGN PATENT DOCUMENTS

WO    WO2007016613 A2    2/2007

(Continued)

*Primary Examiner* — Victor Batson
*Assistant Examiner* — Matthew Sullivan
(74) *Attorney, Agent, or Firm* — Paul & Paul

(57) ABSTRACT

A sliding and rotating hinge module for supporting a display screen or the like, includes a bracket, a slider and a support member. The slider is capable of sliding movement relative to the bracket and the support member is capable of pivotal movement relative to the slider. A drum is rotationally supported by the bracket. A constant force spring is attached to the drum at one end and to the slider at the other end. The constant force spring is biased to wrap around the drum, the constant force spring unwrapping from the drum as the slider moves toward the retracted position. The constant force spring biases the slider toward the extended position. A damping mechanism damps the rotational motion of the drum relative to the bracket for smooth, non-abrupt movement of the slider.

13 Claims, 37 Drawing Sheets

U.S. PATENT DOCUMENTS

| | | |
|---|---|---|
| 6,832,862 B2 | 12/2004 | Giese |
| 6,871,384 B2 | 3/2005 | Novin et al. |
| 6,909,408 B2 | 6/2005 | Matko et al. |
| 7,010,833 B2 | 3/2006 | Duarte et al. |
| 7,626,357 B2 * | 12/2009 | Hoffman et al. .............. 320/110 |
| 2004/0123782 A1 | 7/2004 | Korber et al. |
| 2005/0056755 A1 | 3/2005 | Kimura |
| 2008/0185992 A1 * | 8/2008 | Hoffman et al. .............. 320/110 |
| 2008/0189908 A1 * | 8/2008 | Lowry et al. .................... 16/231 |

FOREIGN PATENT DOCUMENTS

WO    WO 2007016613 A2 *    2/2007

* cited by examiner

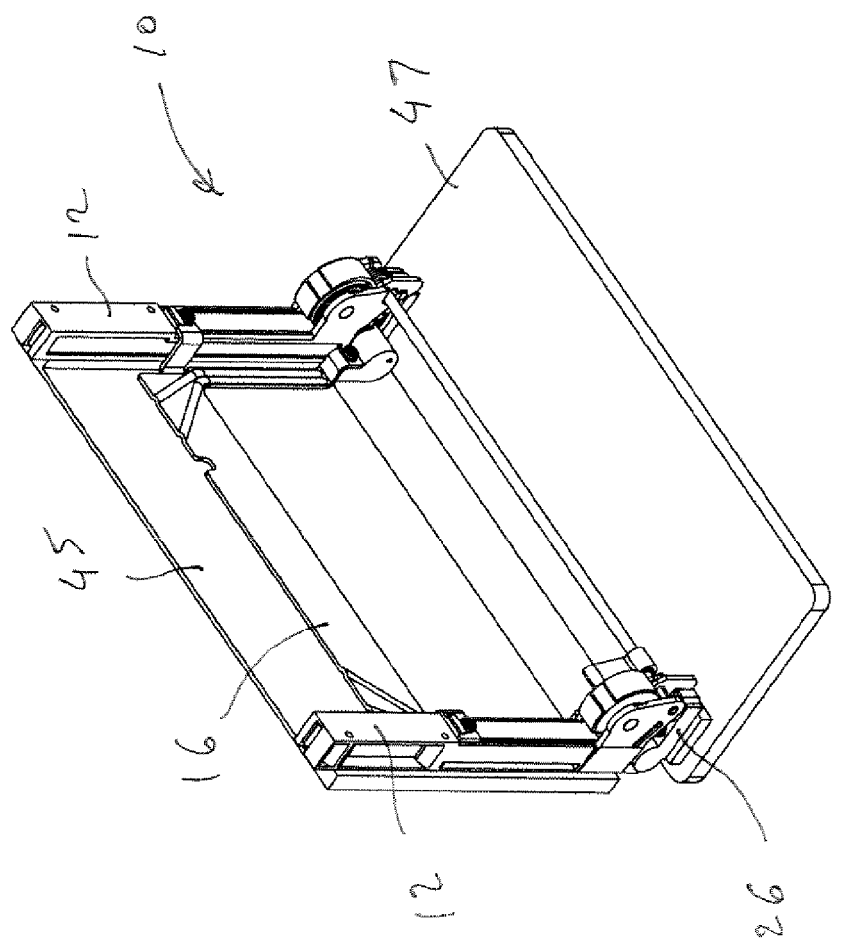

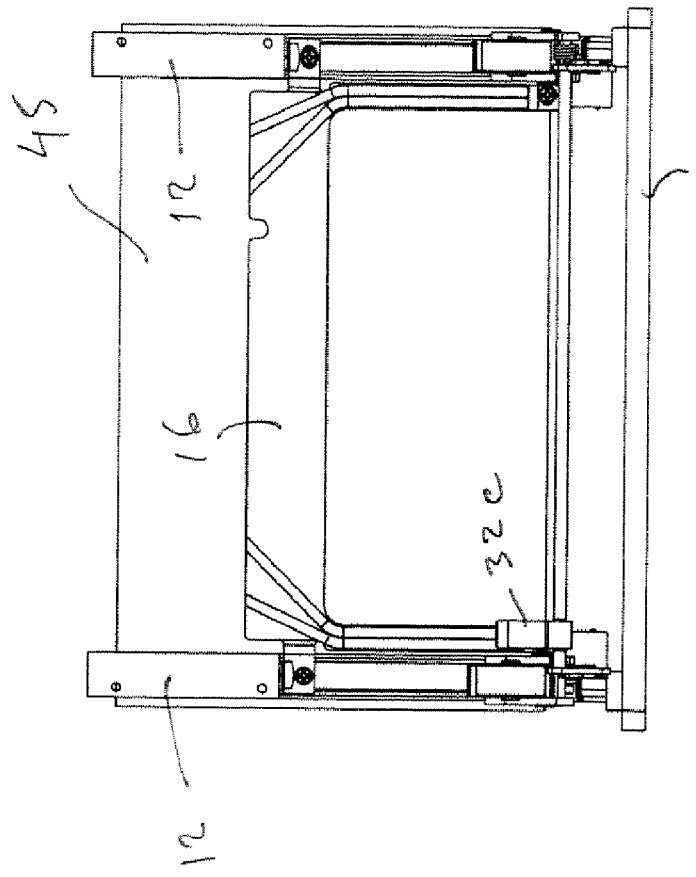
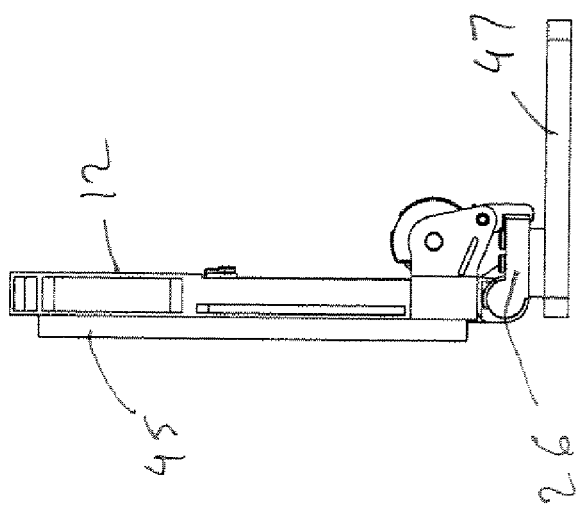
Fig. 4
Fig. 3

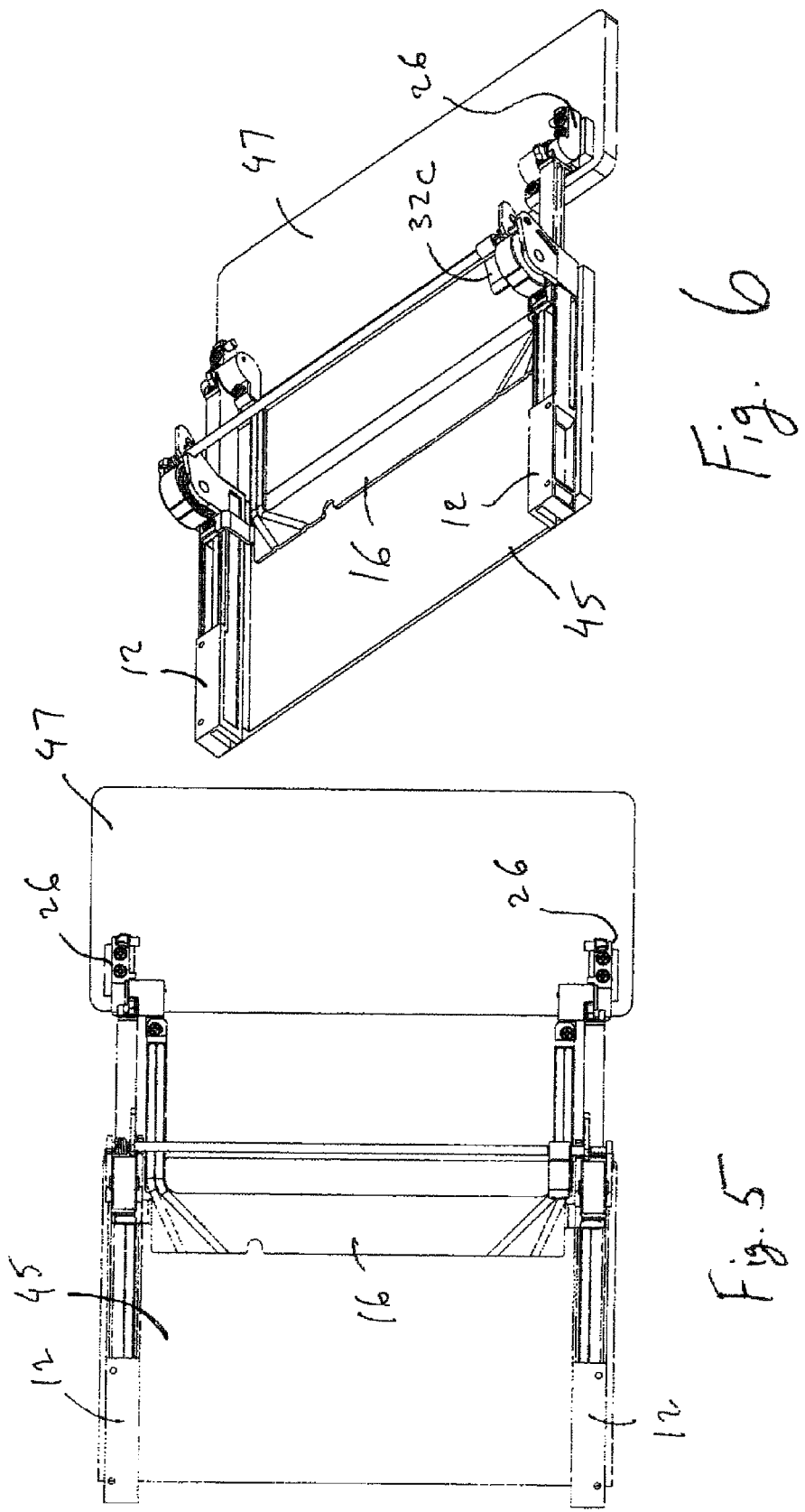

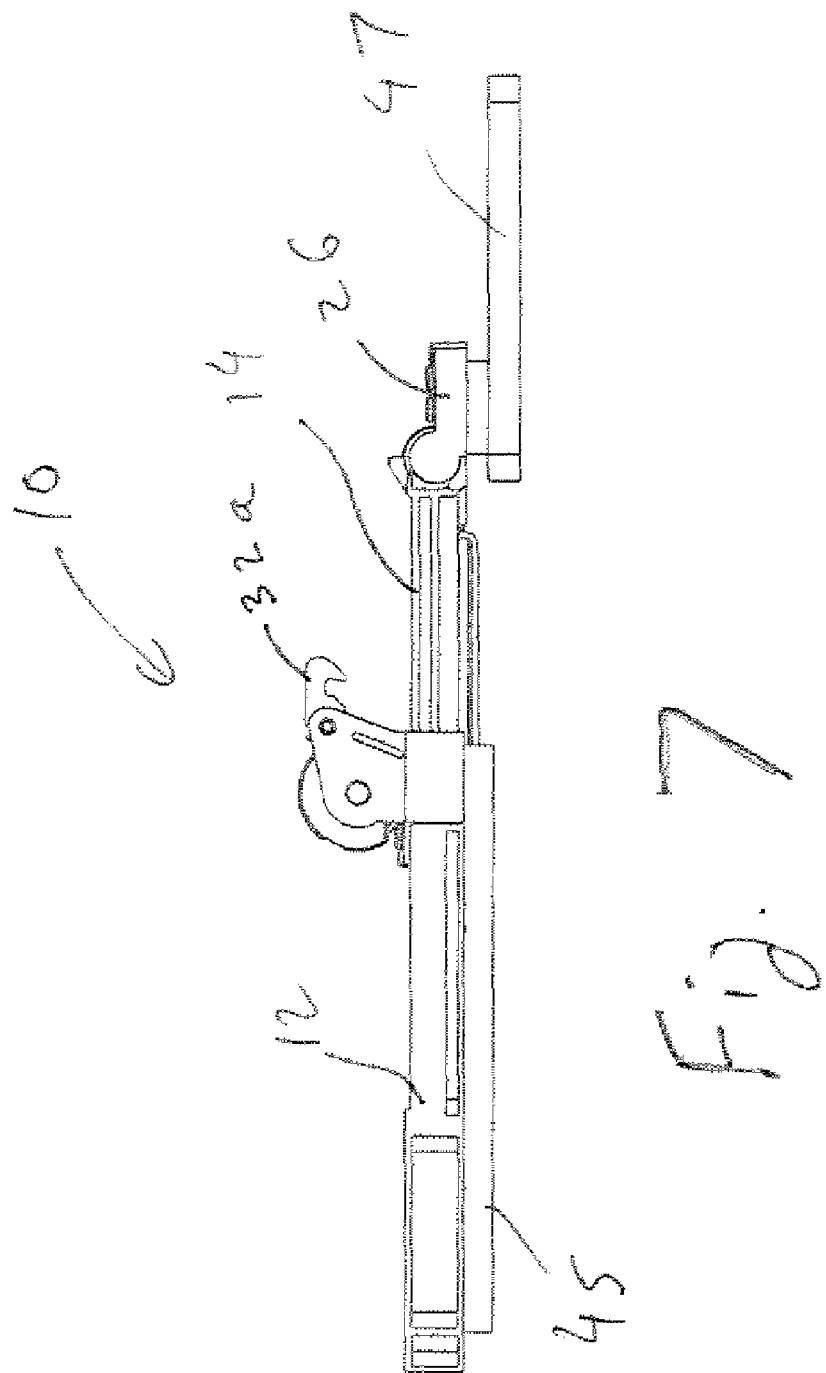

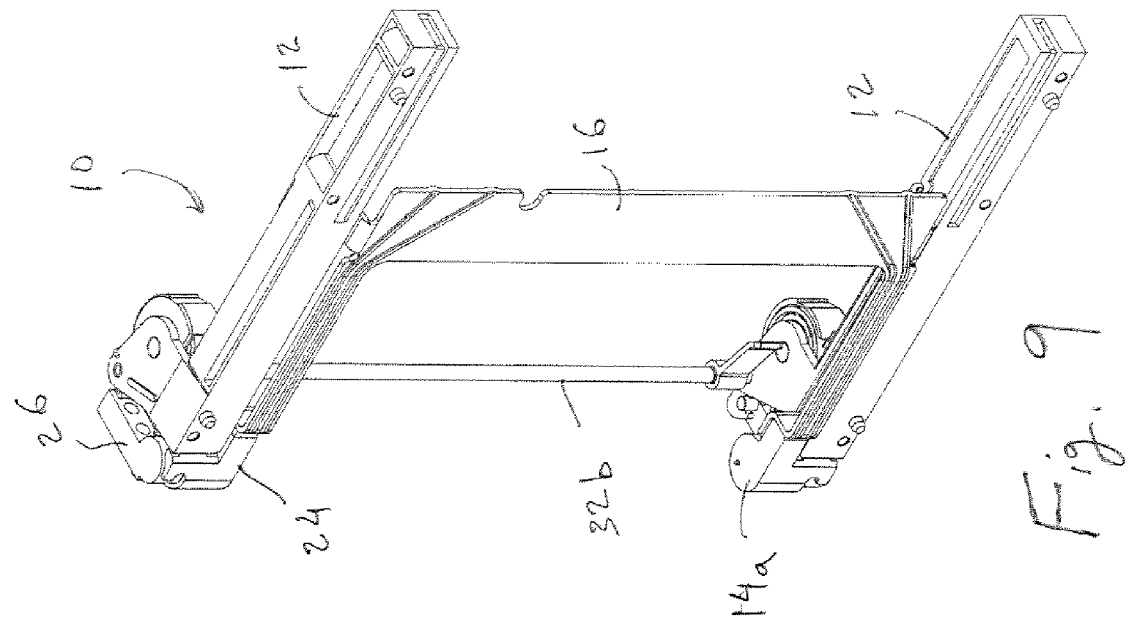
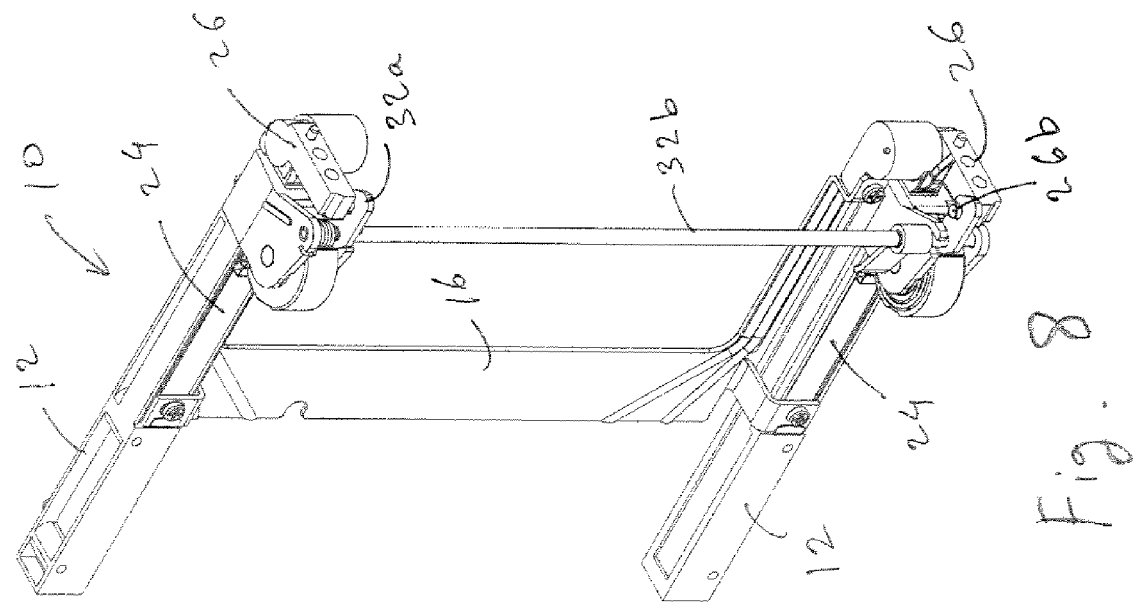

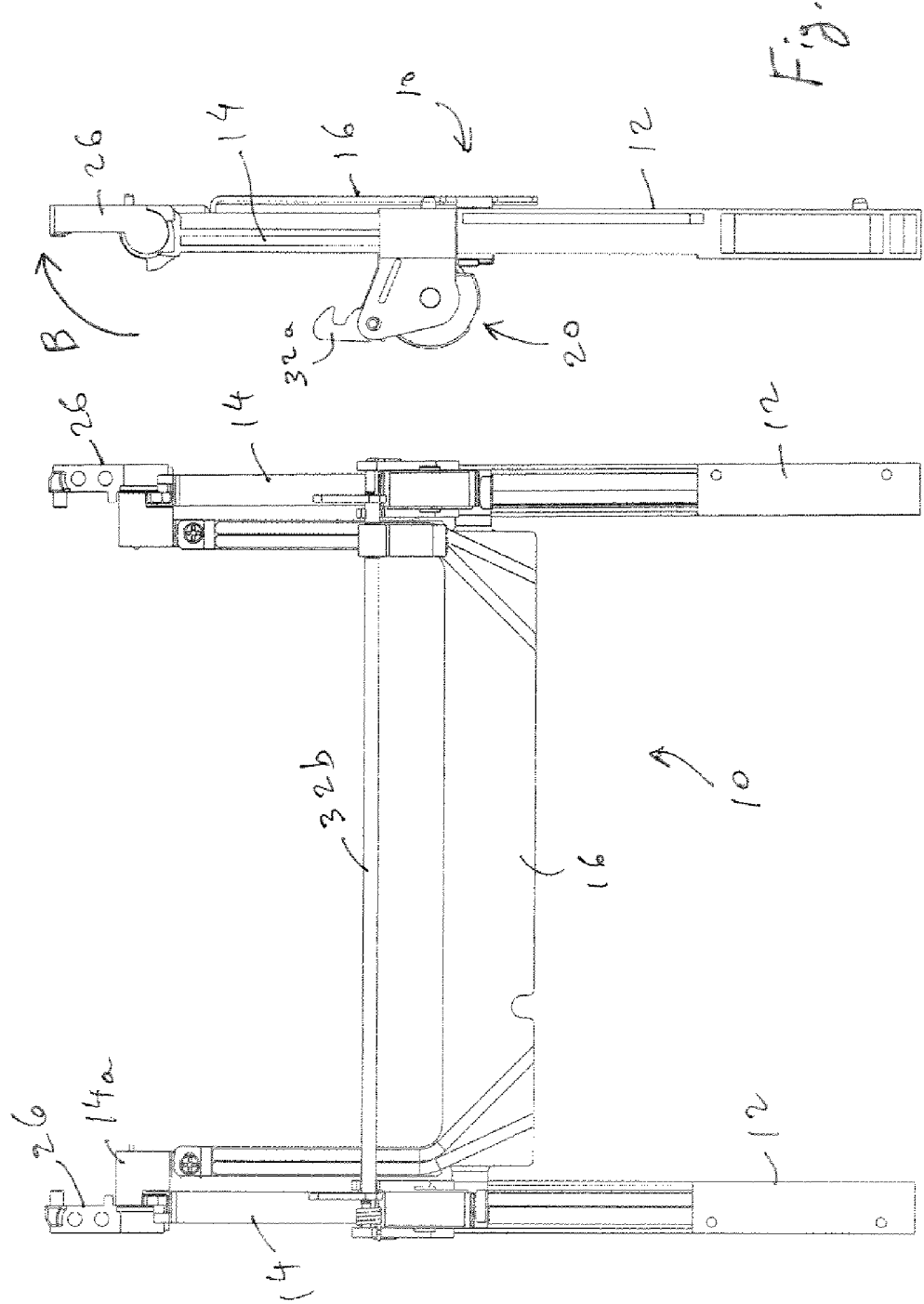

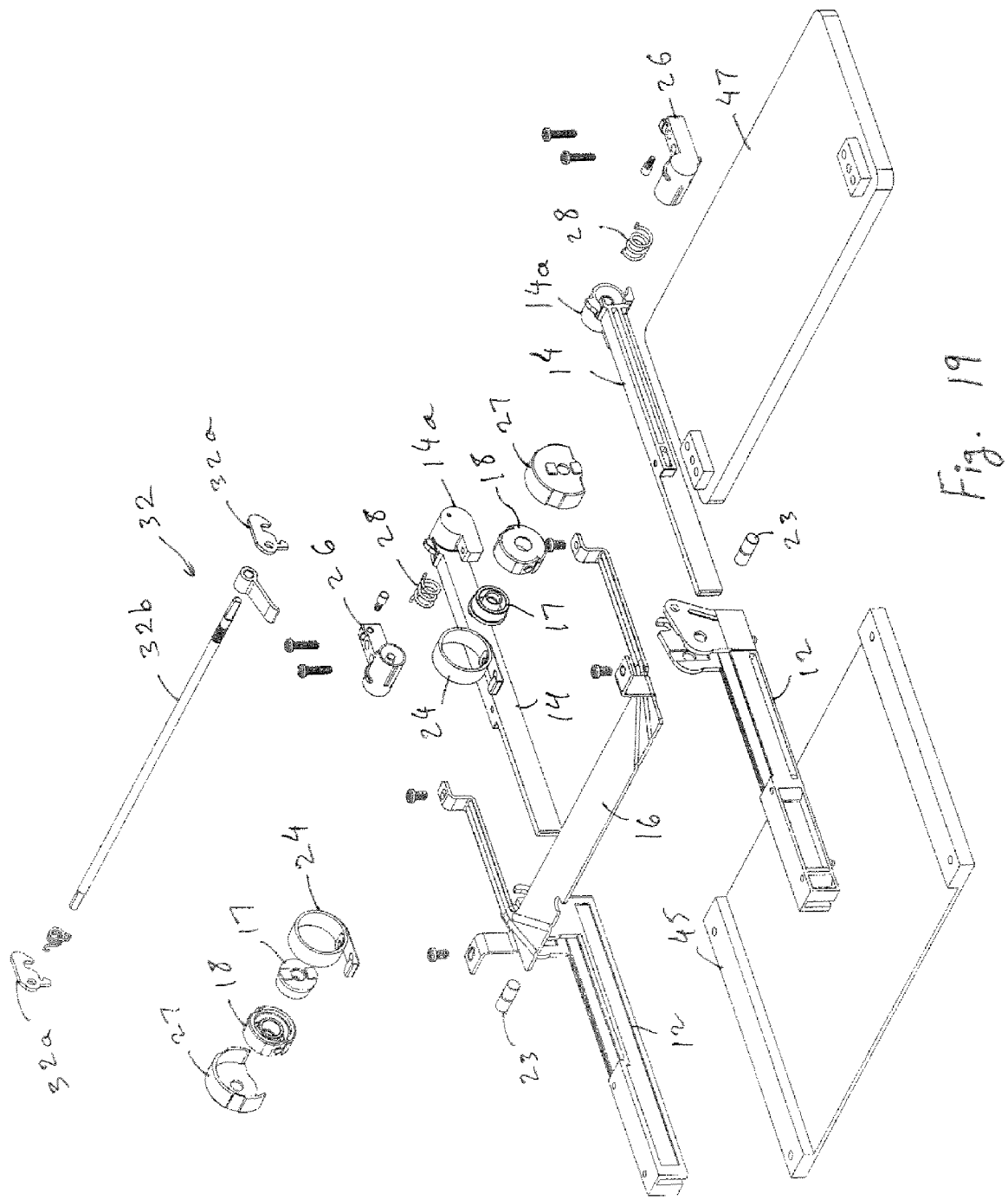

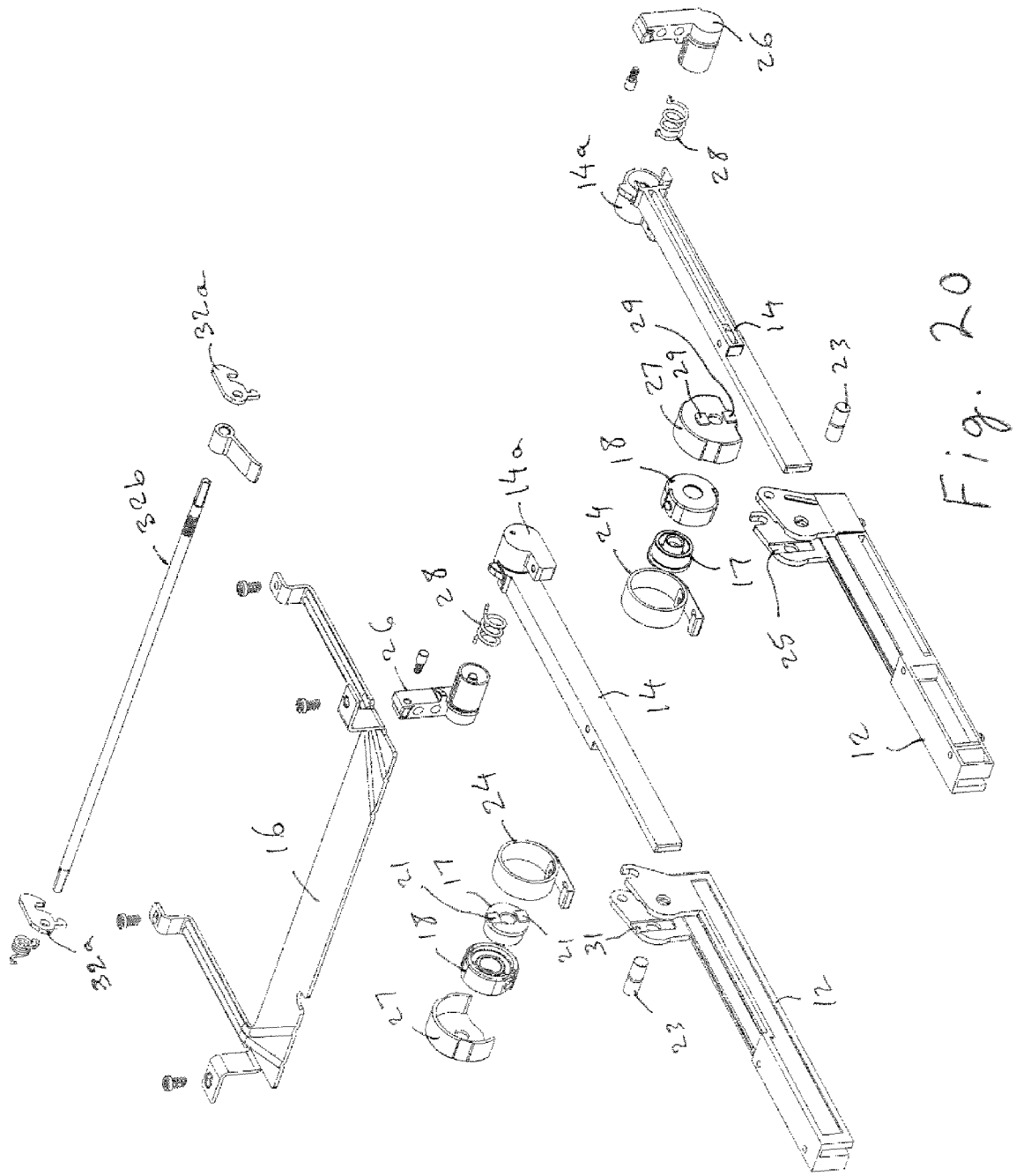

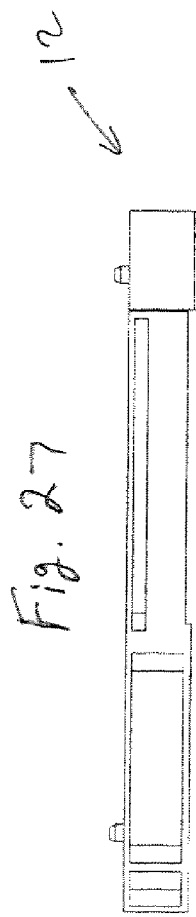
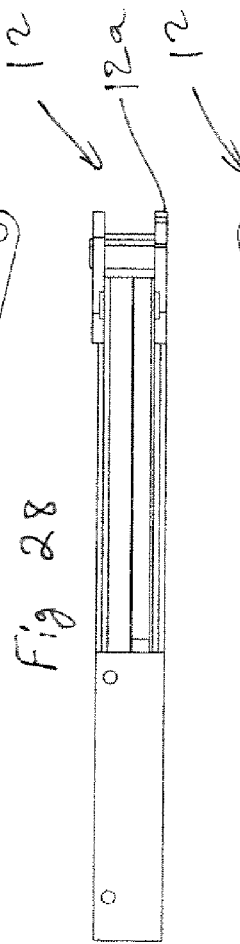
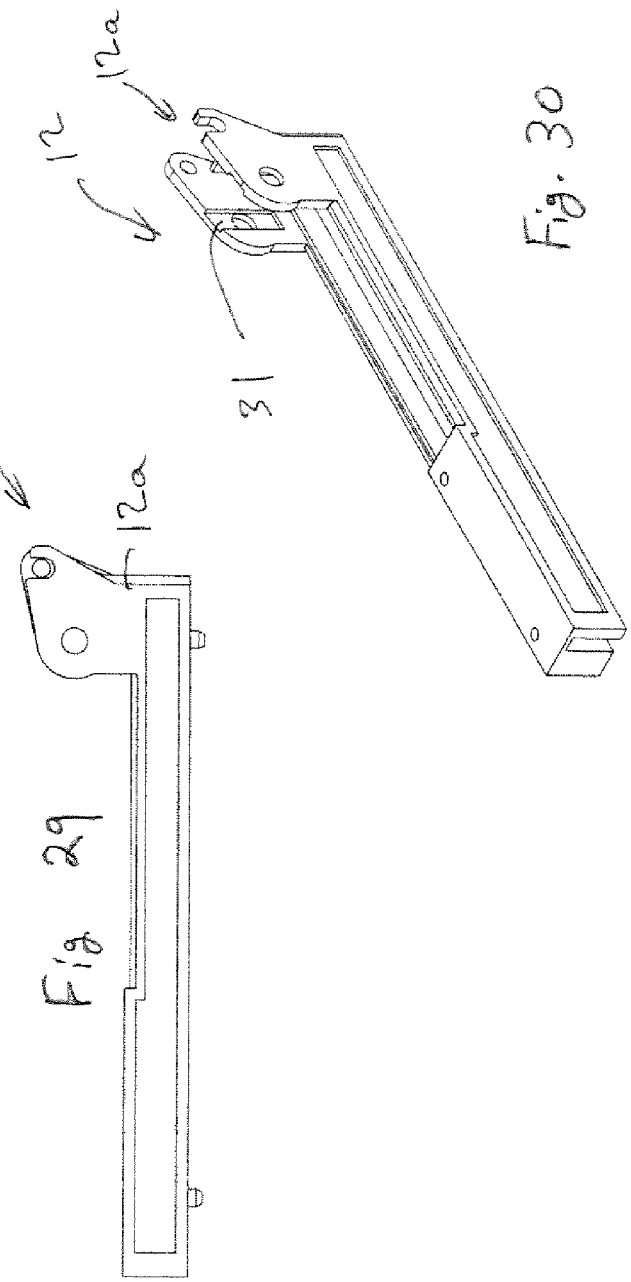

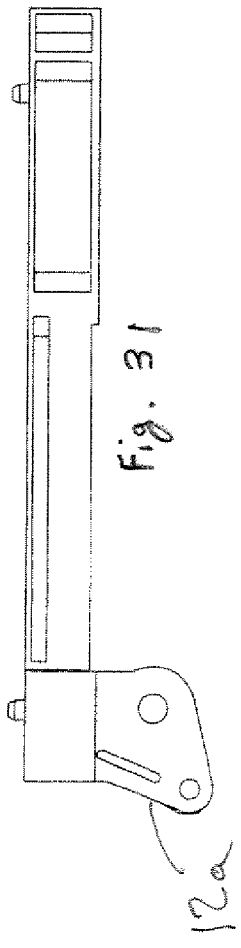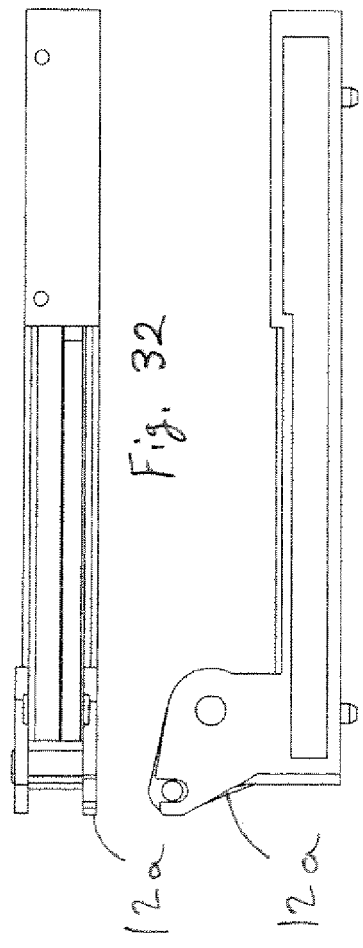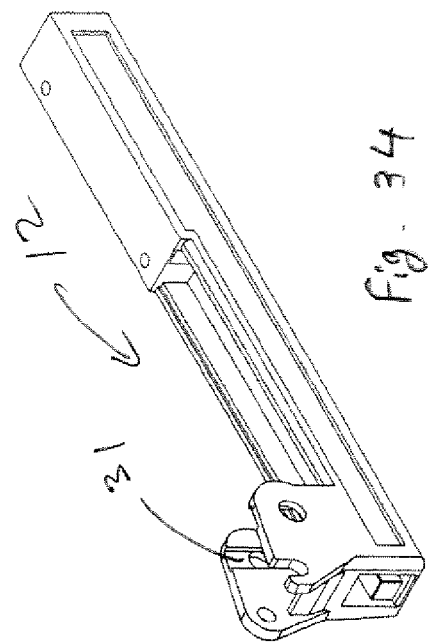

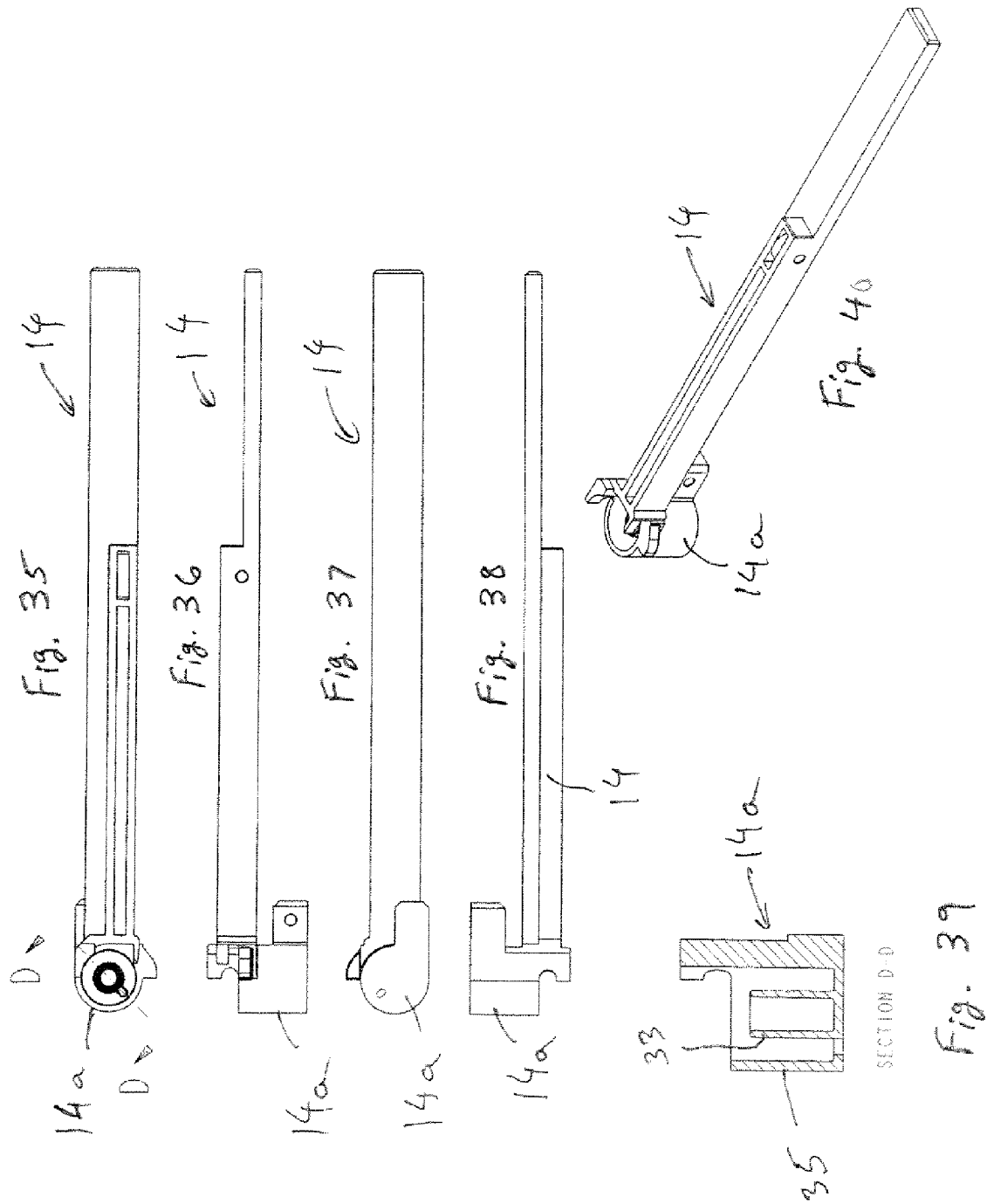

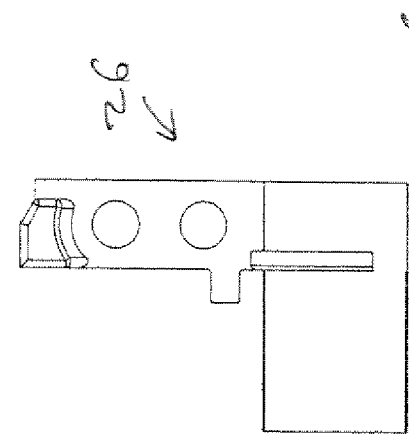
Fig. 45
Fig. 44
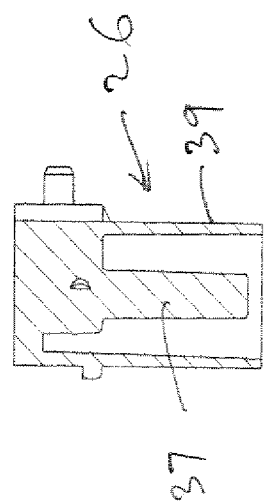
Fig. 46
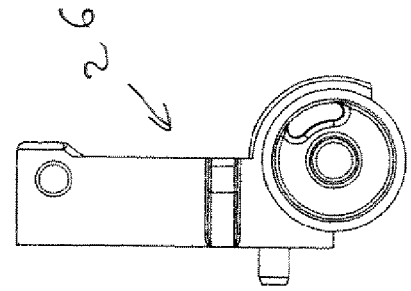
Fig. 43
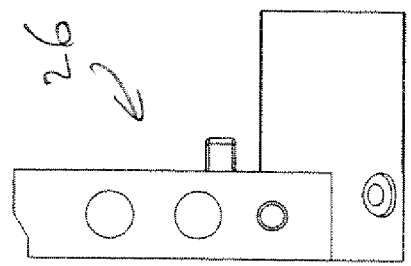
Fig. 41
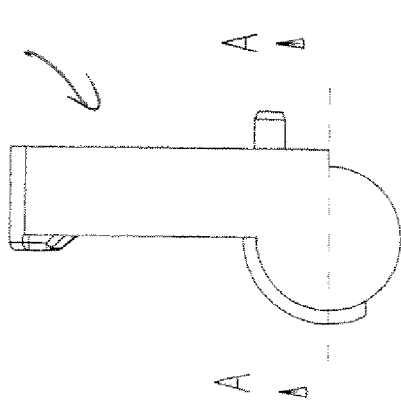
Fig. 42

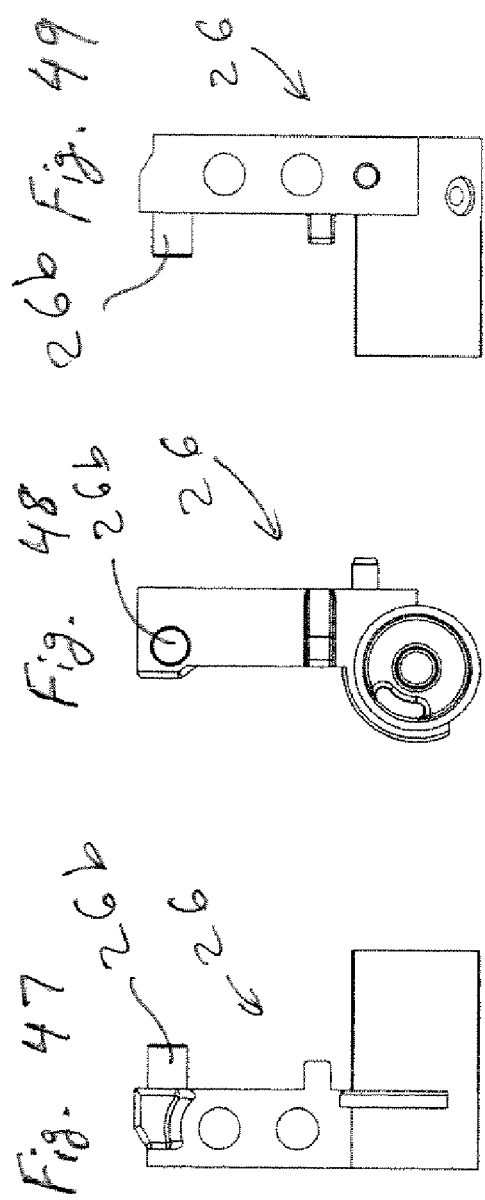

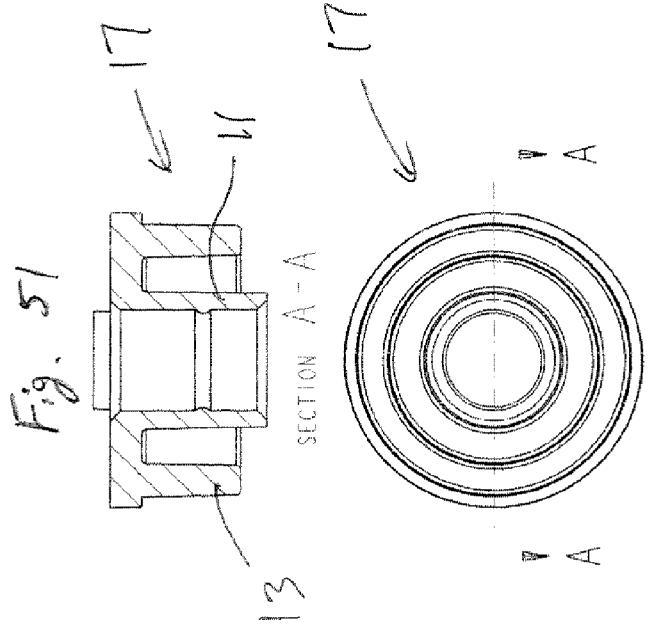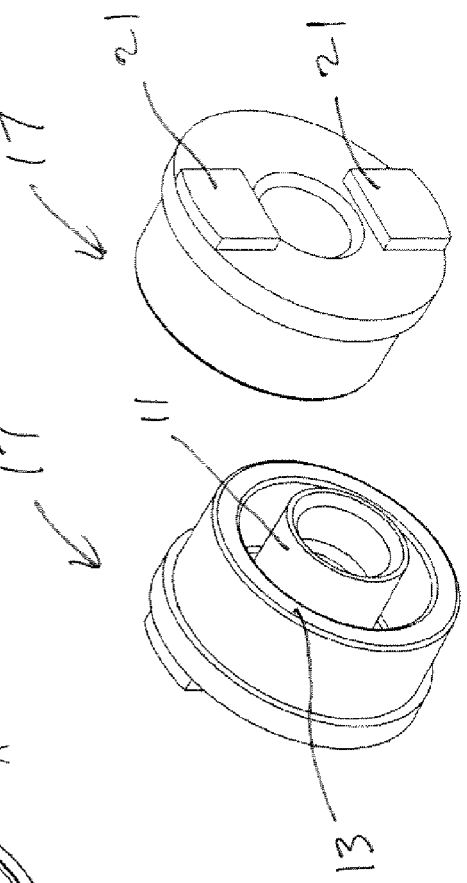

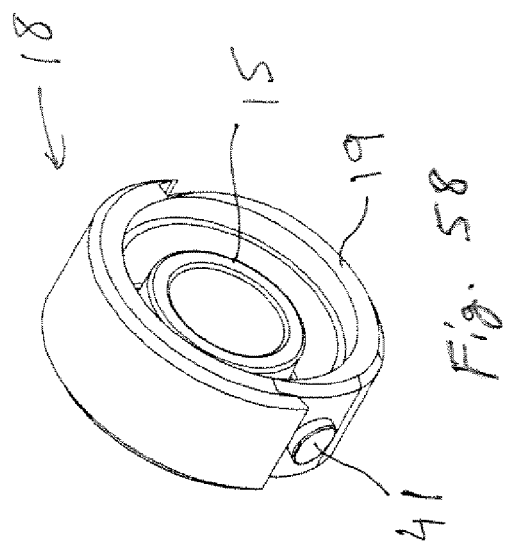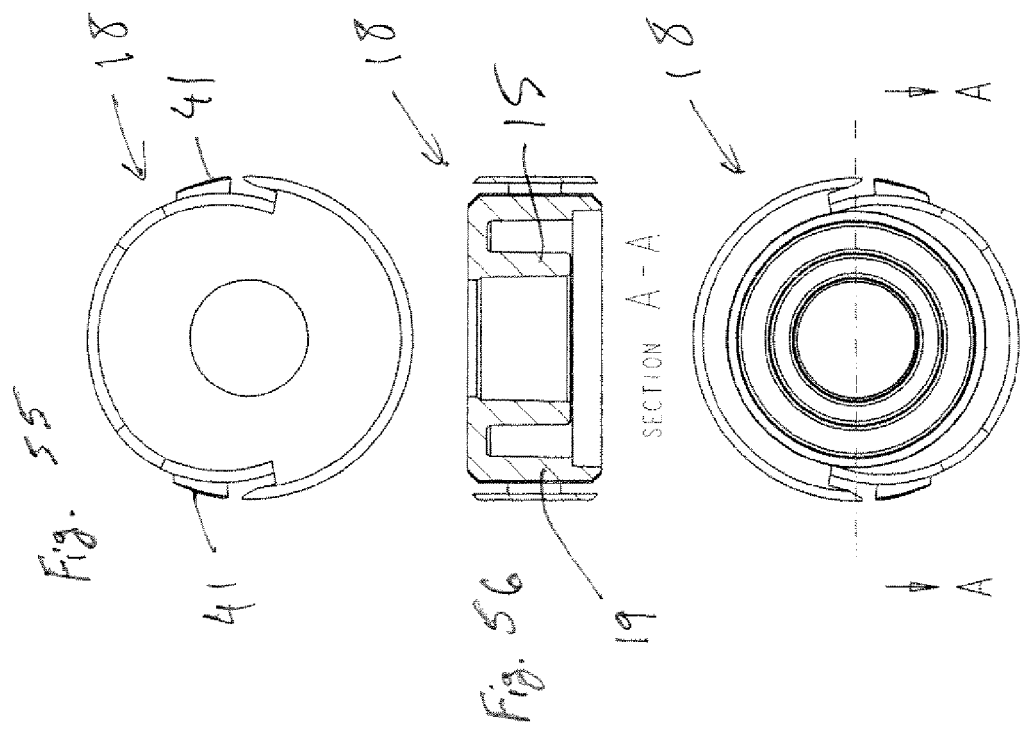

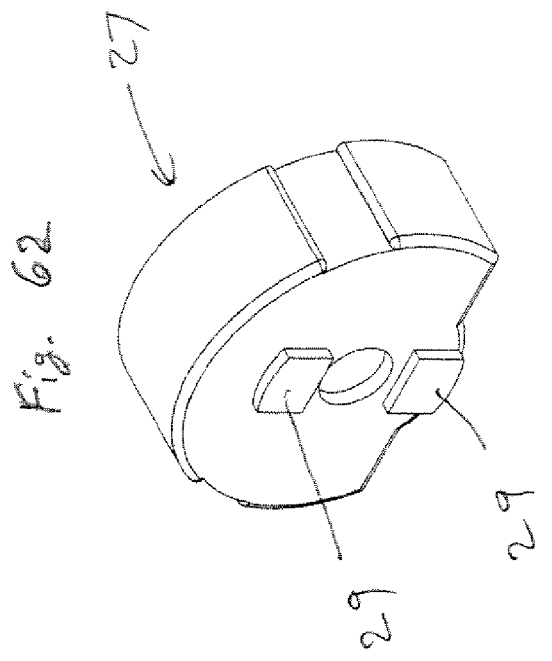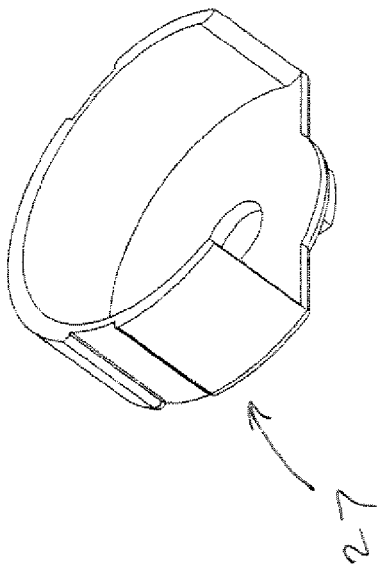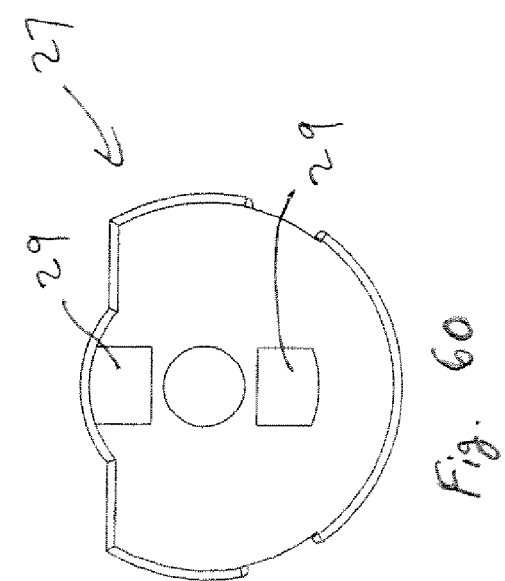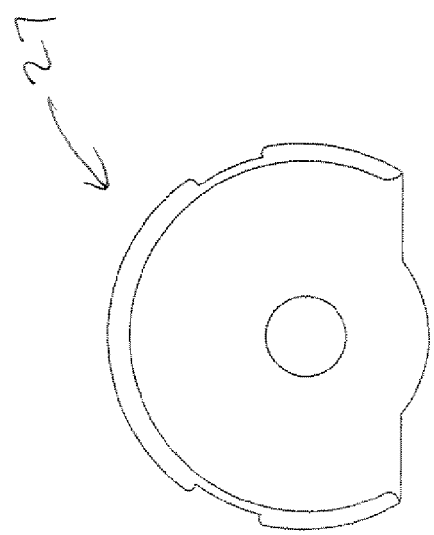

SECTION A-A

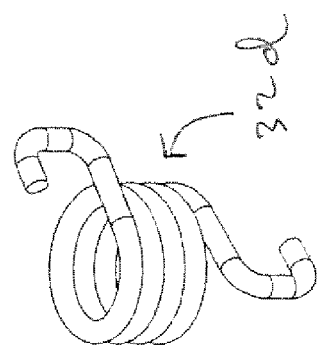
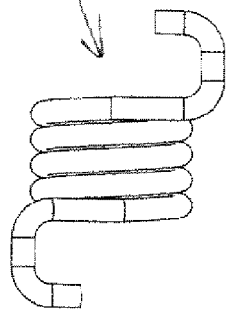
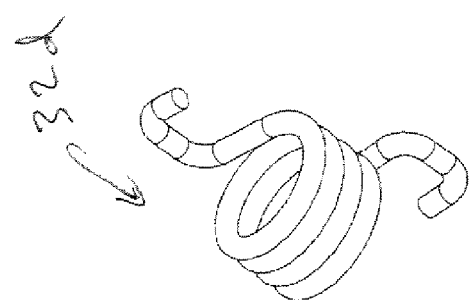

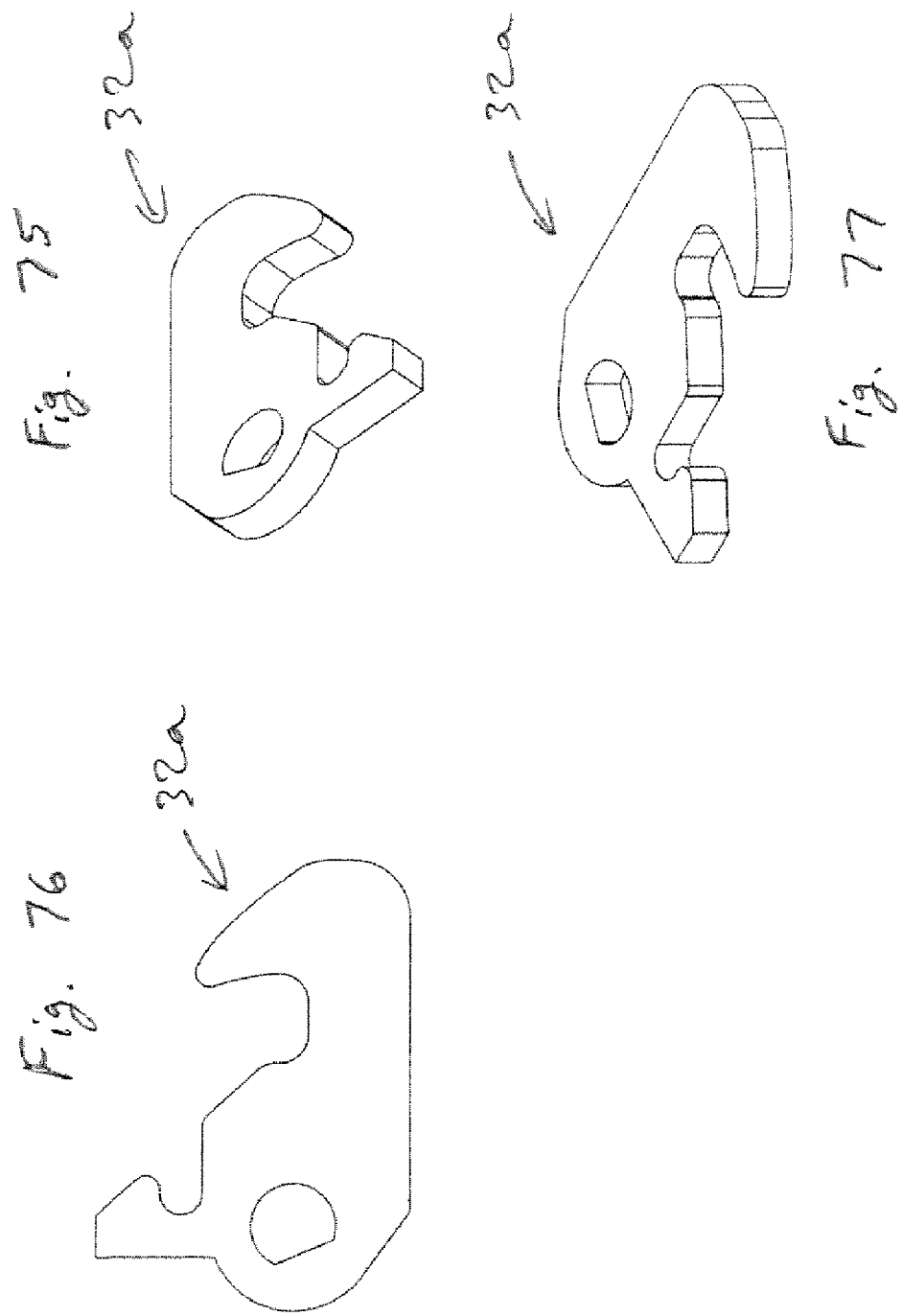

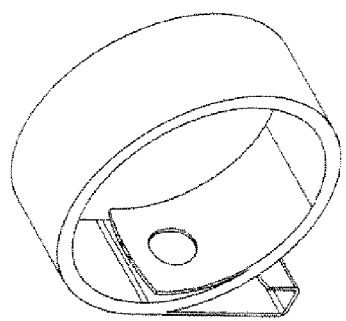
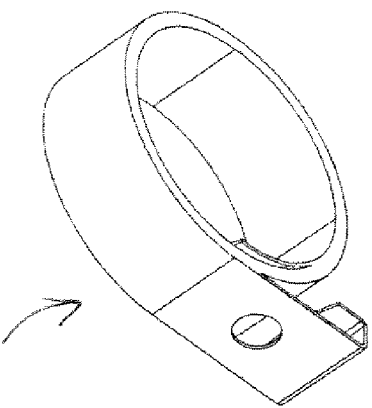
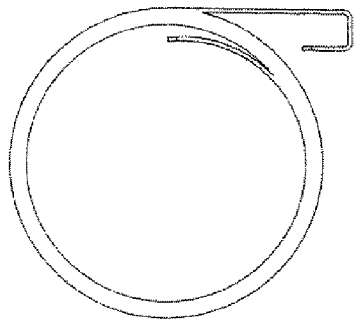

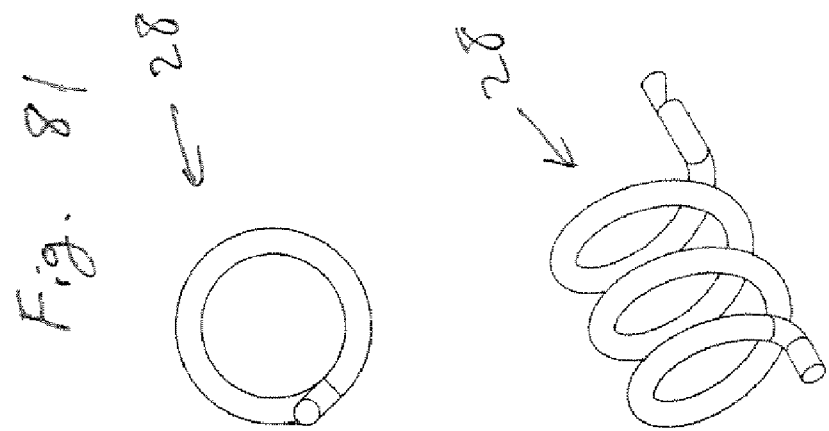
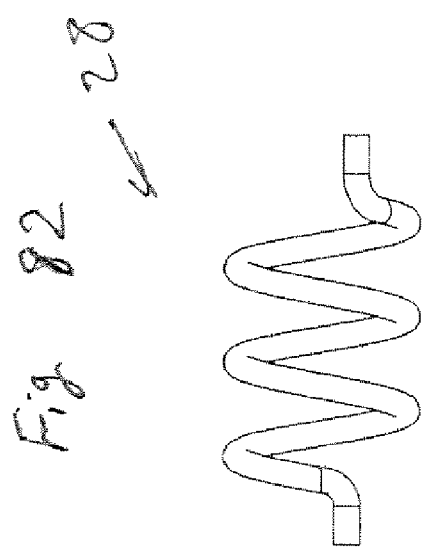
Fig. 81
Fig. 82
Fig. 83

SLIDING AND ROTATING HINGE MODULE

CROSS REFERENCE TO RELATED APPLICATIONS

This application claims the benefit of the priority of, and is the non-provisional of, U.S. provisional application for patent Ser. No. 60/891,039, filed on Feb. 21, 2007, the entirety of which is incorporated herein by reference.

BACKGROUND OF THE INVENTION

This invention generally relates to hinge modules and, more particularly, to a sliding and rotating hinge module.

Typically, hinges that provide constant-speed sliding and rotating motion have required motors or other actuators to do so. Such hinges are typically relatively complex and require electricity to power them. The added complexity of motorized hinges provides for an increased potential of failure, whether it be mechanical failure or failure to operate due to a power outage or a broken or faulty electrical connection. The added complexity also translates into higher costs for making, buying, using, and/or replacing the hinge. It would be desirable to have a less complex, less expensive hinge module that provides generally constant-speed sliding and rotating motion without the use of a motor or actuator or electricity to drive the hinge module.

SUMMARY OF THE INVENTION

A sliding and rotating hinge module for supporting a display screen or the like, includes a bracket, a slider and a support member. The slider is capable of sliding movement relative to said bracket and said support member is capable of pivotal movement relative to the slider. A drum is rotationally supported by the bracket. A constant force spring is attached to the drum at one end and to the slider at the other end. The constant force spring is biased to wrap around the drum, the constant force spring unwrapping from the drum as the slider moves toward the retracted position. The constant force spring biases the slider toward the extended position. A damping mechanism damps the rotational motion of the drum relative to the bracket for smooth, non-abrupt movement of the slider.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings:

FIGS. 1-7 are environmental views of a hinge module in accordance with the present invention;

FIGS. 8-18 are views of a hinge module in accordance with the present invention;

FIGS. 19-21 are exploded views of a hinge module in accordance with the present invention;

FIGS. 27-88 are views of the component parts of a hinge module in accordance with the present invention.

DETAILED DESCRIPTION OF THE INVENTION

Figure 1:
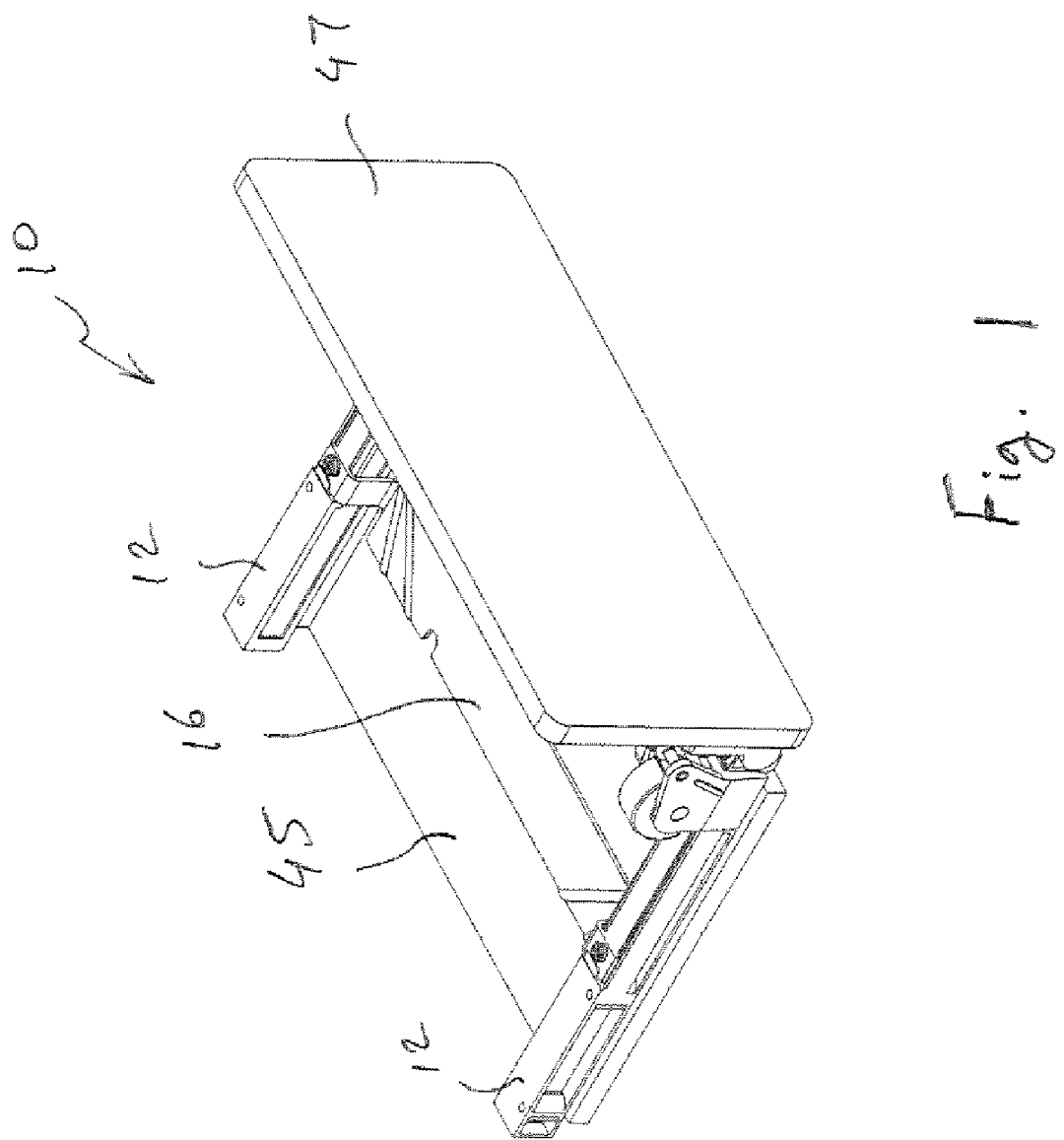
Figure 11:
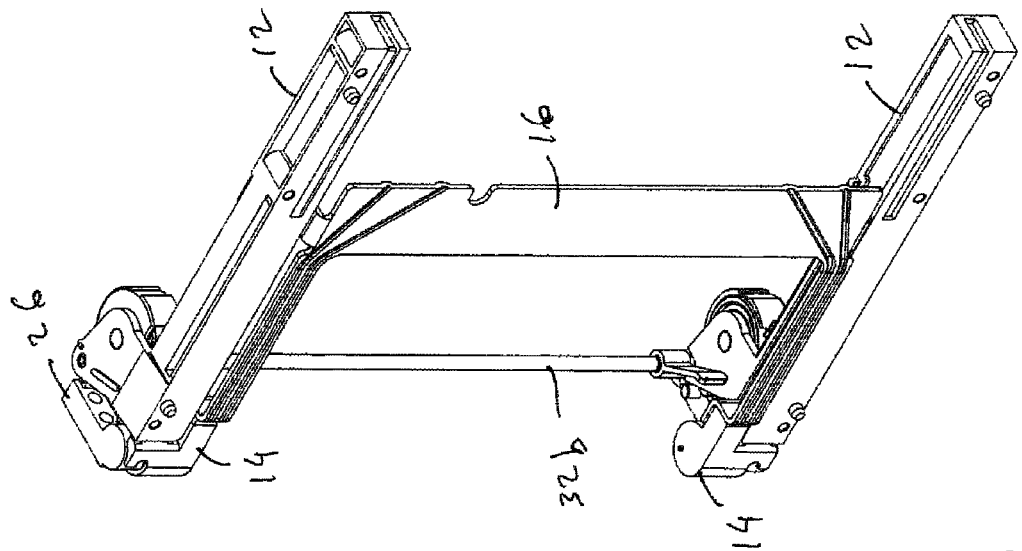
Figure 10:
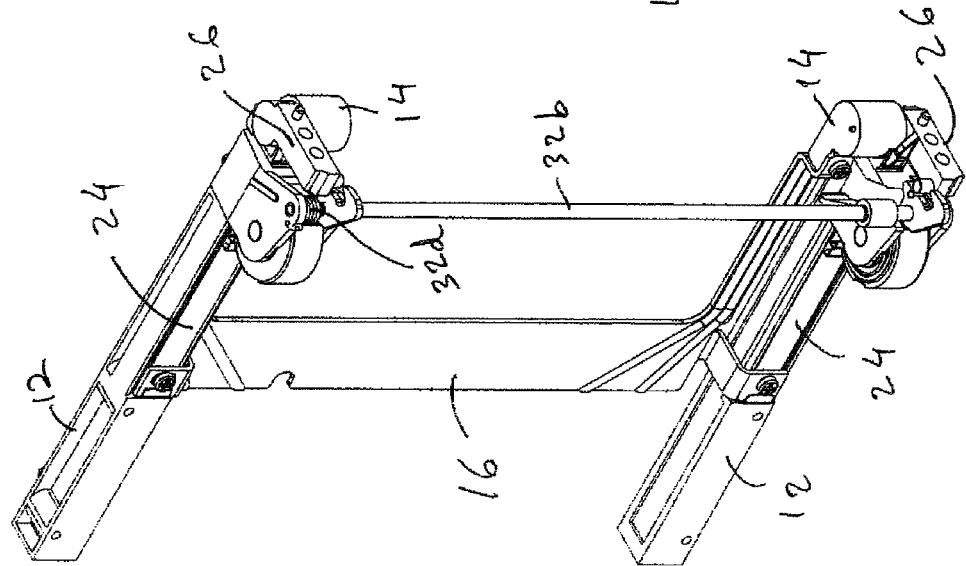
Figure 12:
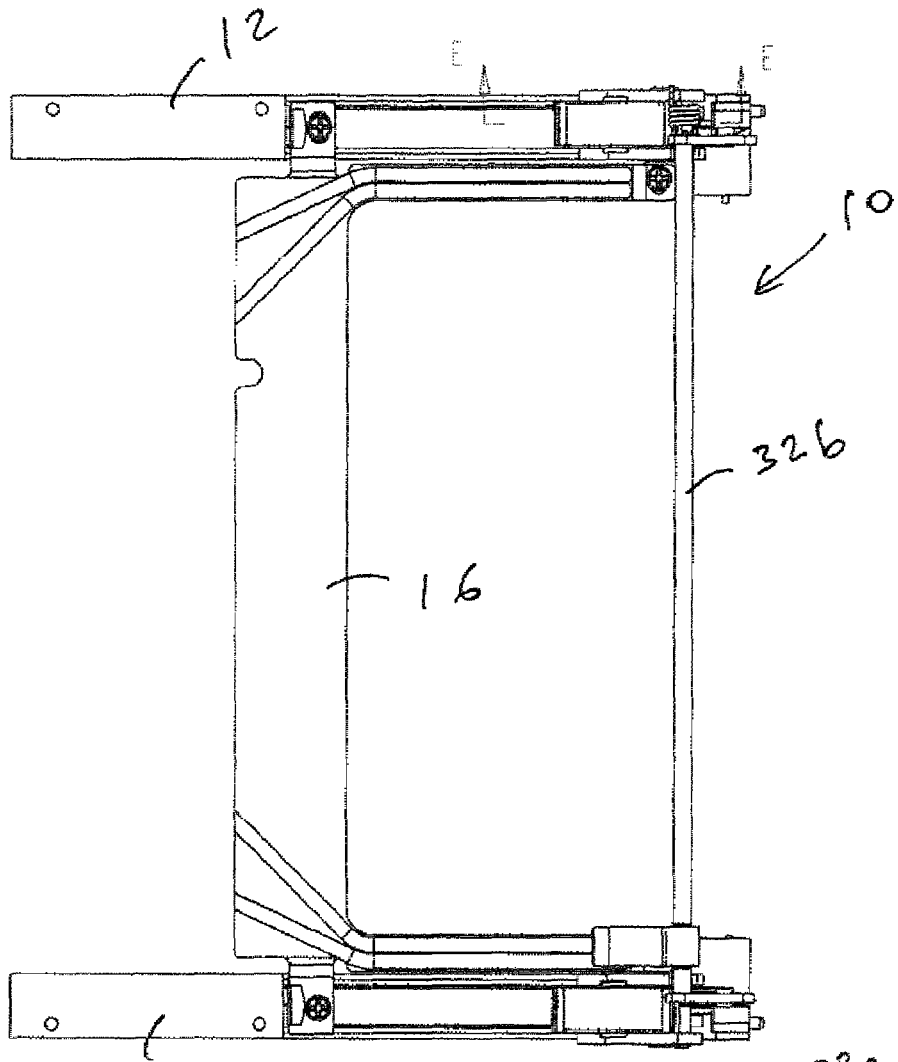
Figure 13:
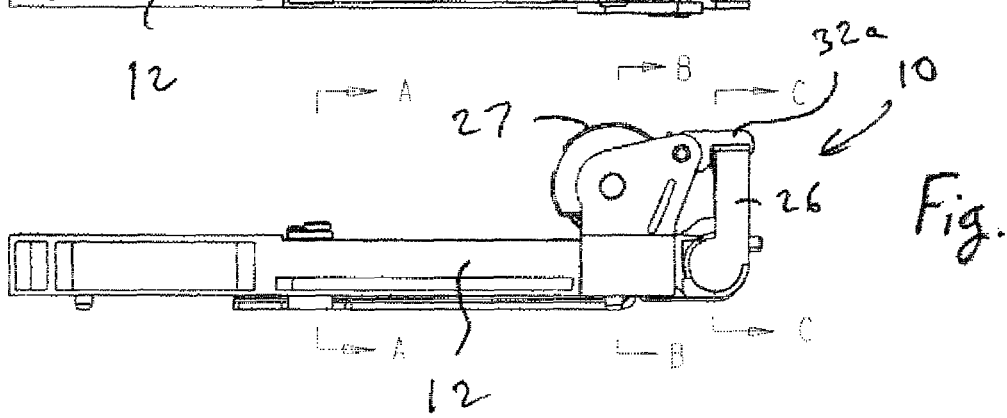
Figure 14:
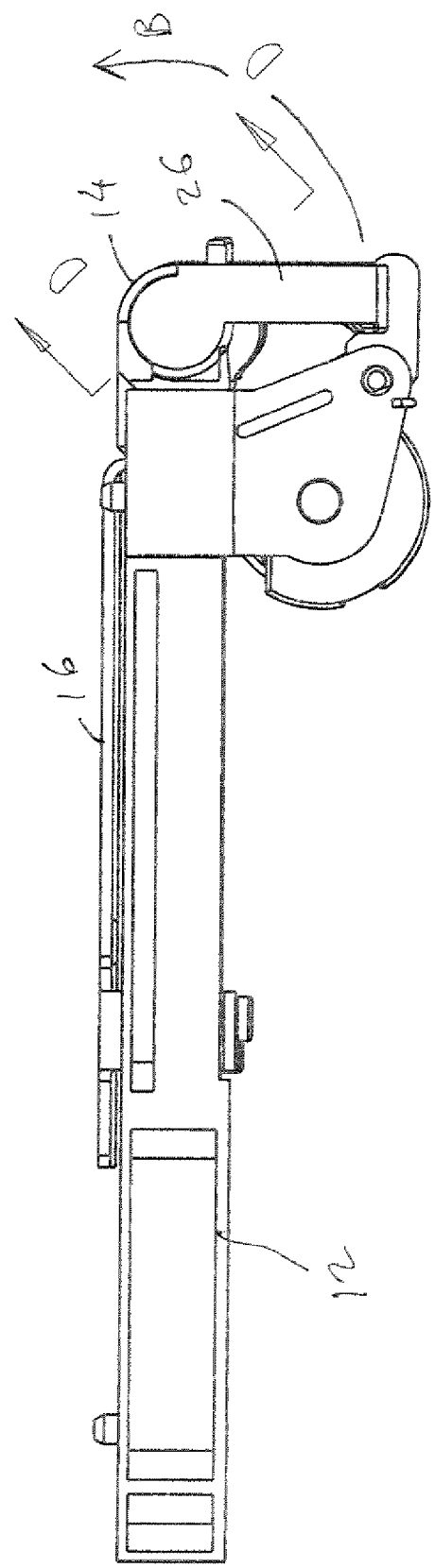
Figure 16:
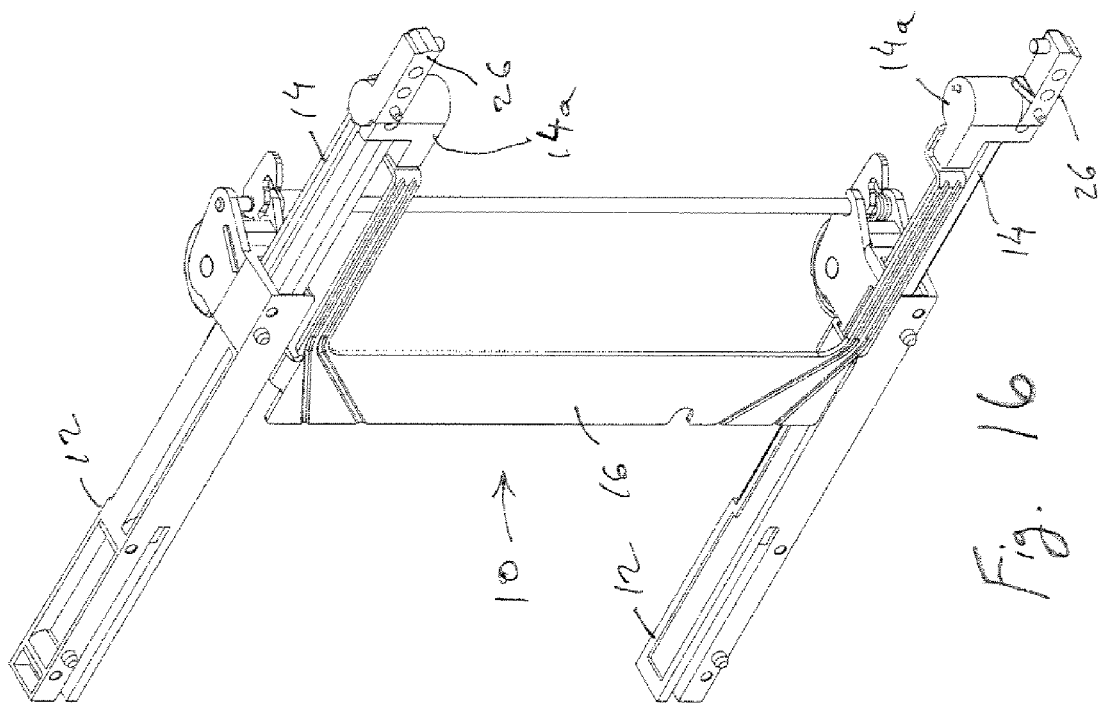
Figure 15:
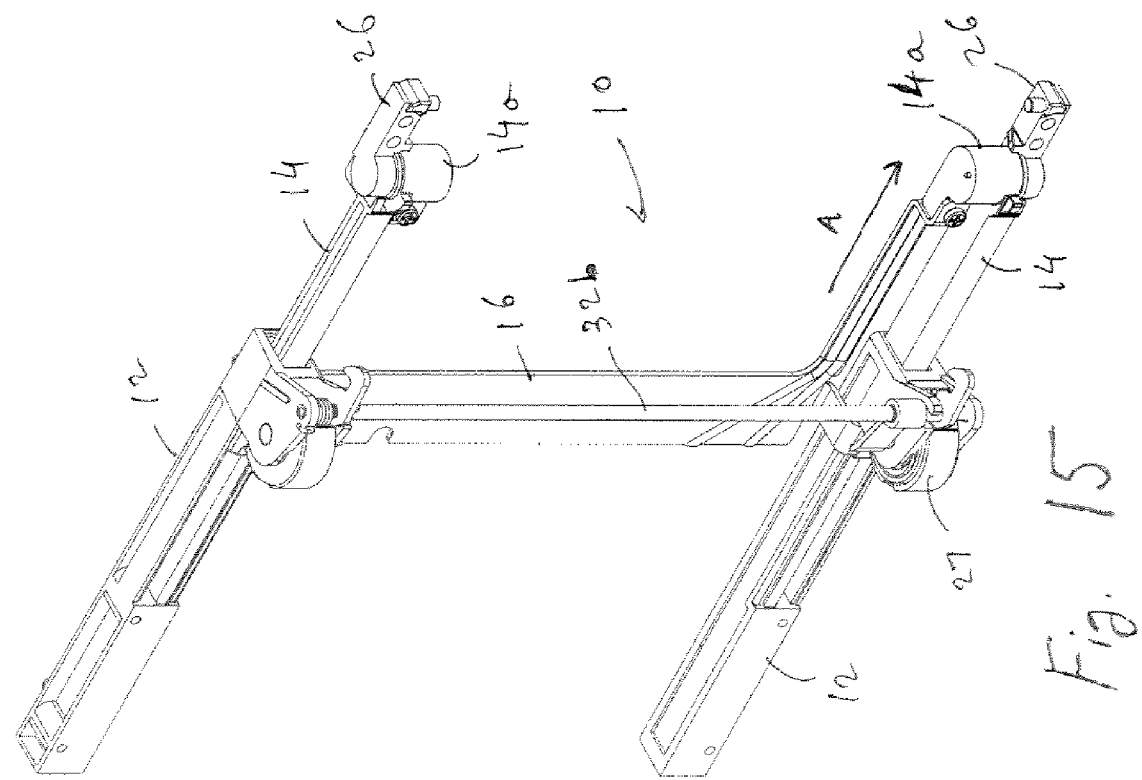
Figure 21:
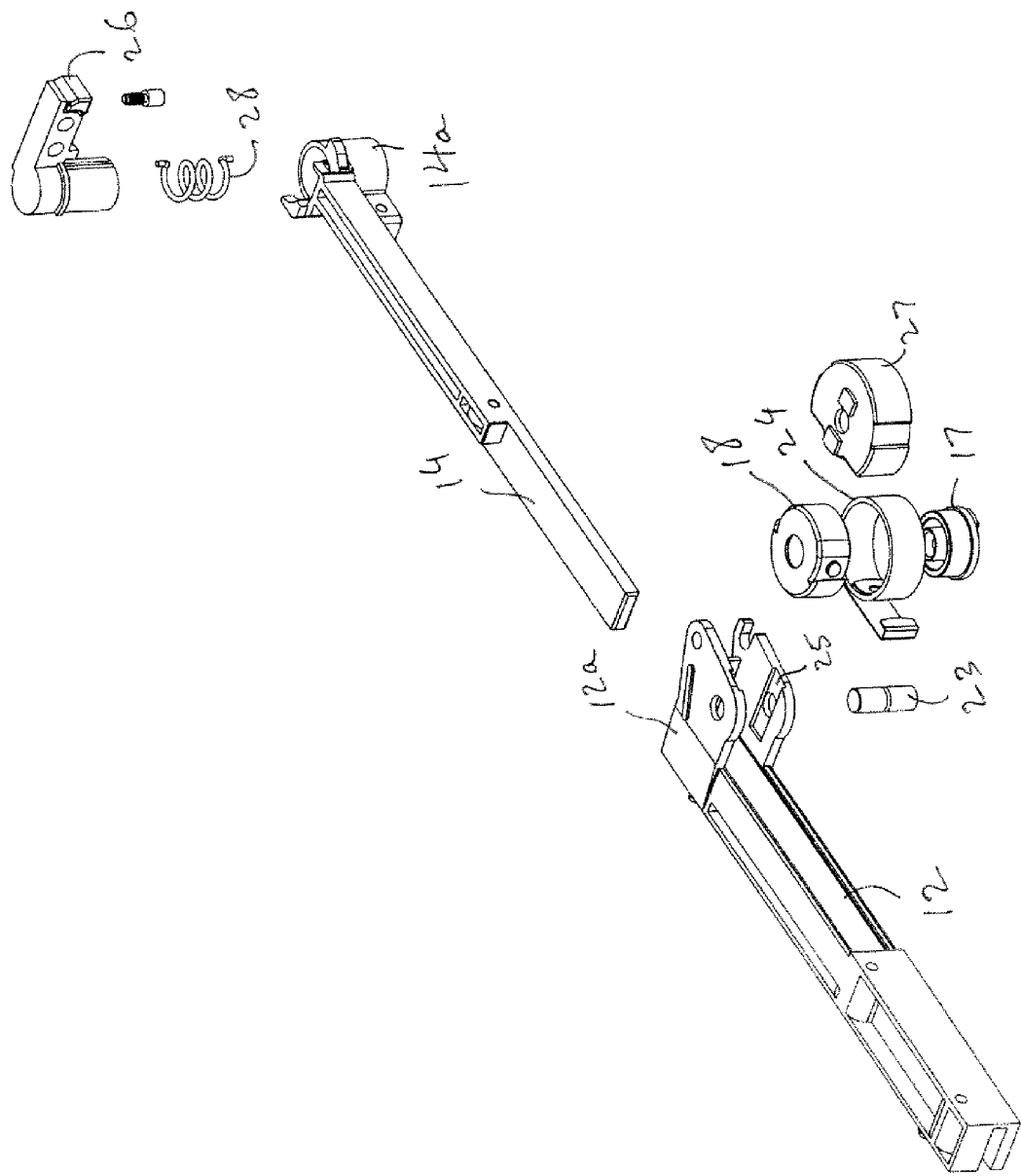
Figure 22:
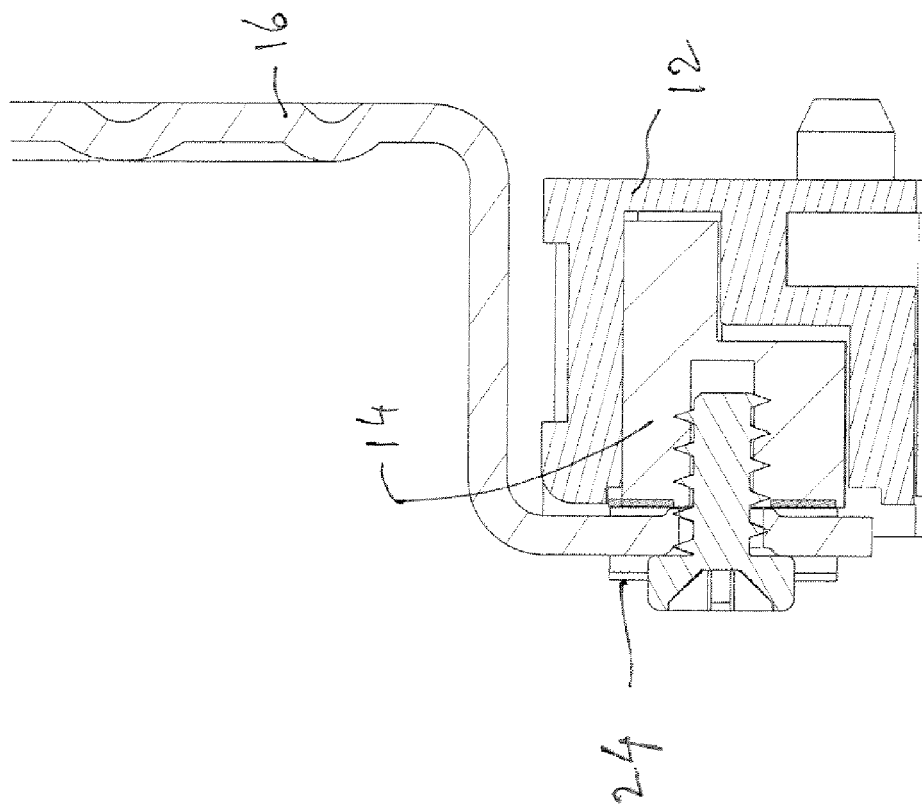
FIGS. 22-26 are fragmentary views showing details of a hinge module in accordance with the present invention.
Figure 23:
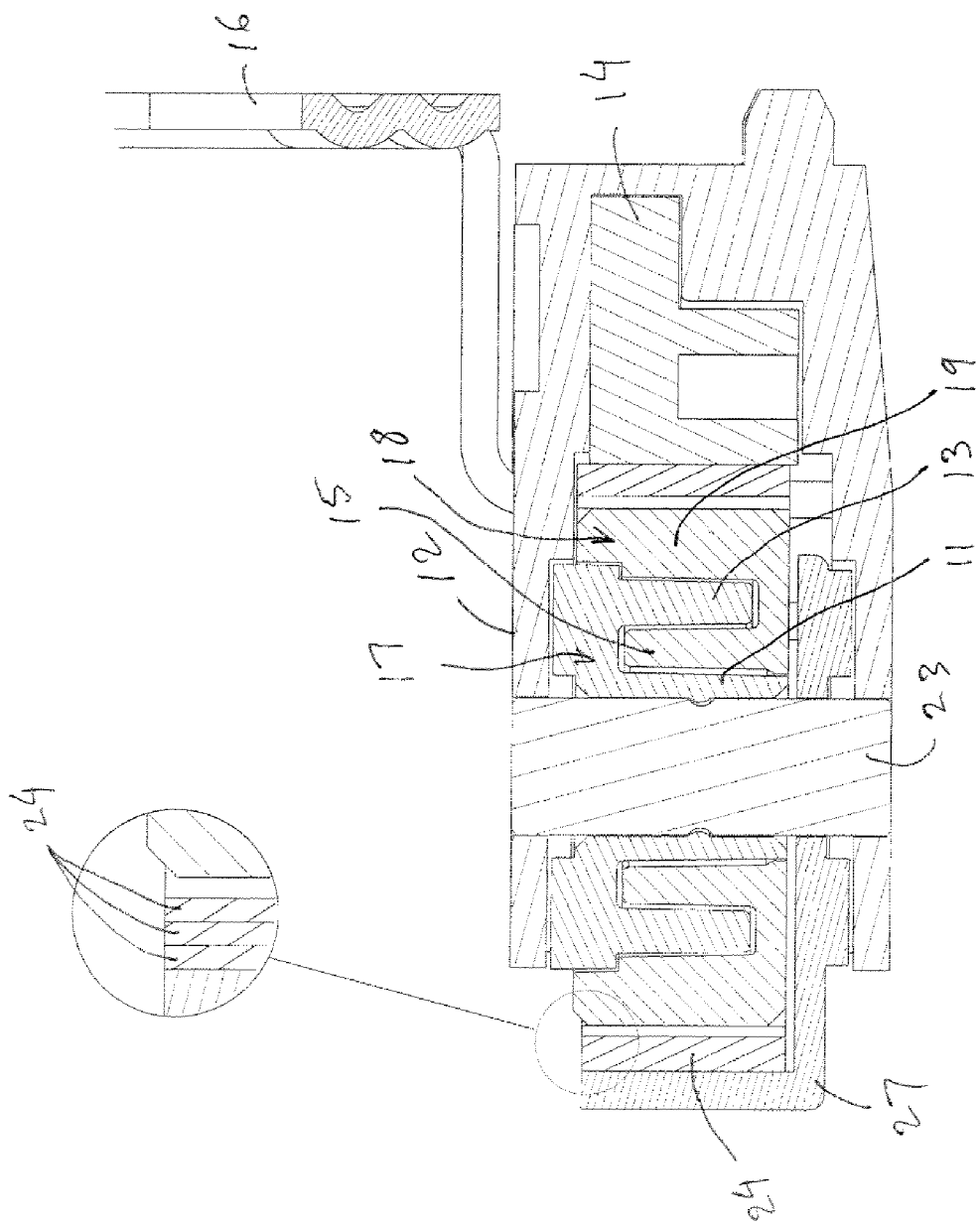
Figure 24:
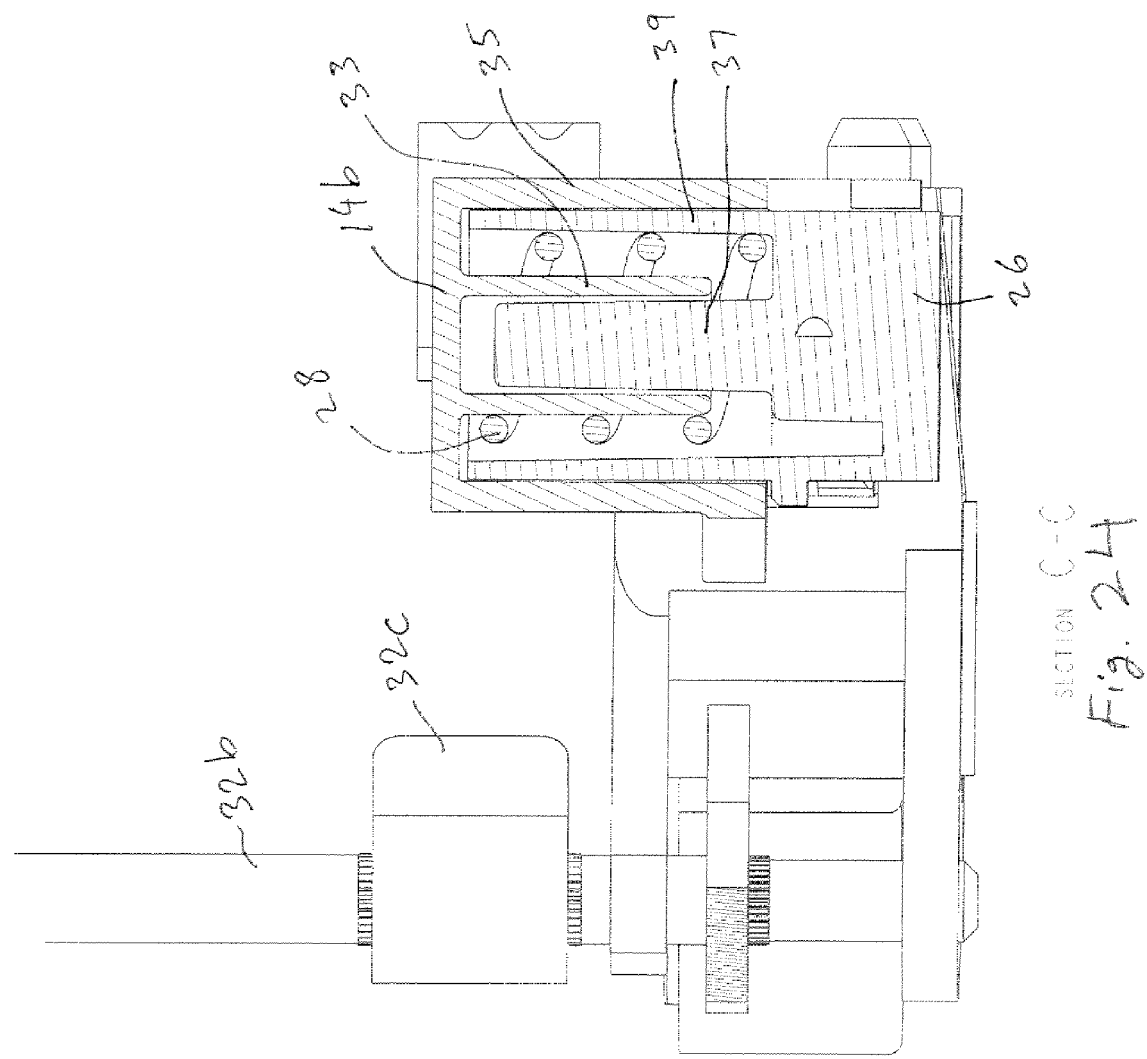
Figure 25:
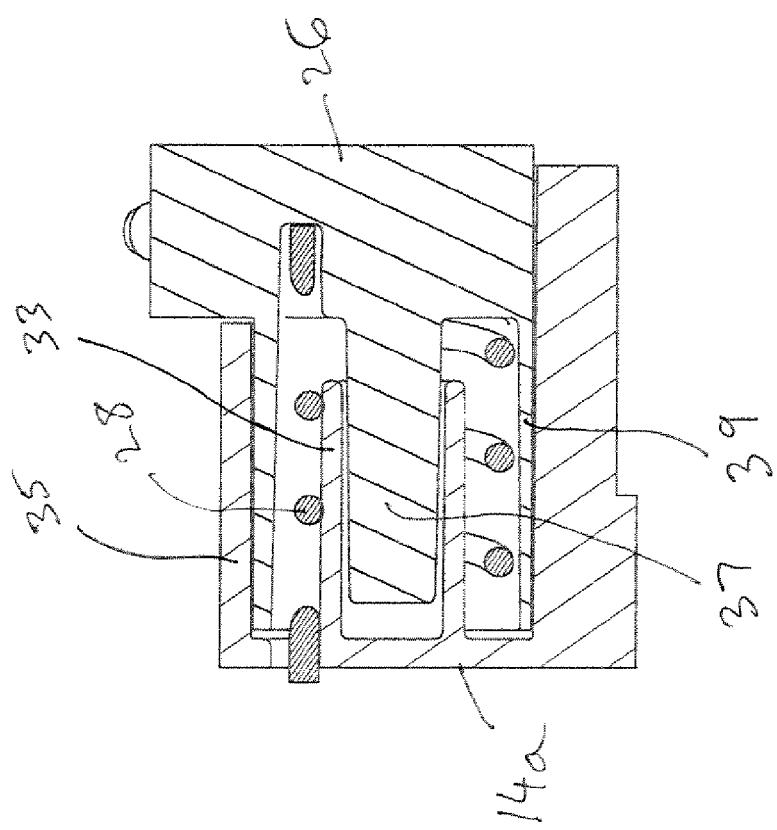
Figure 26:
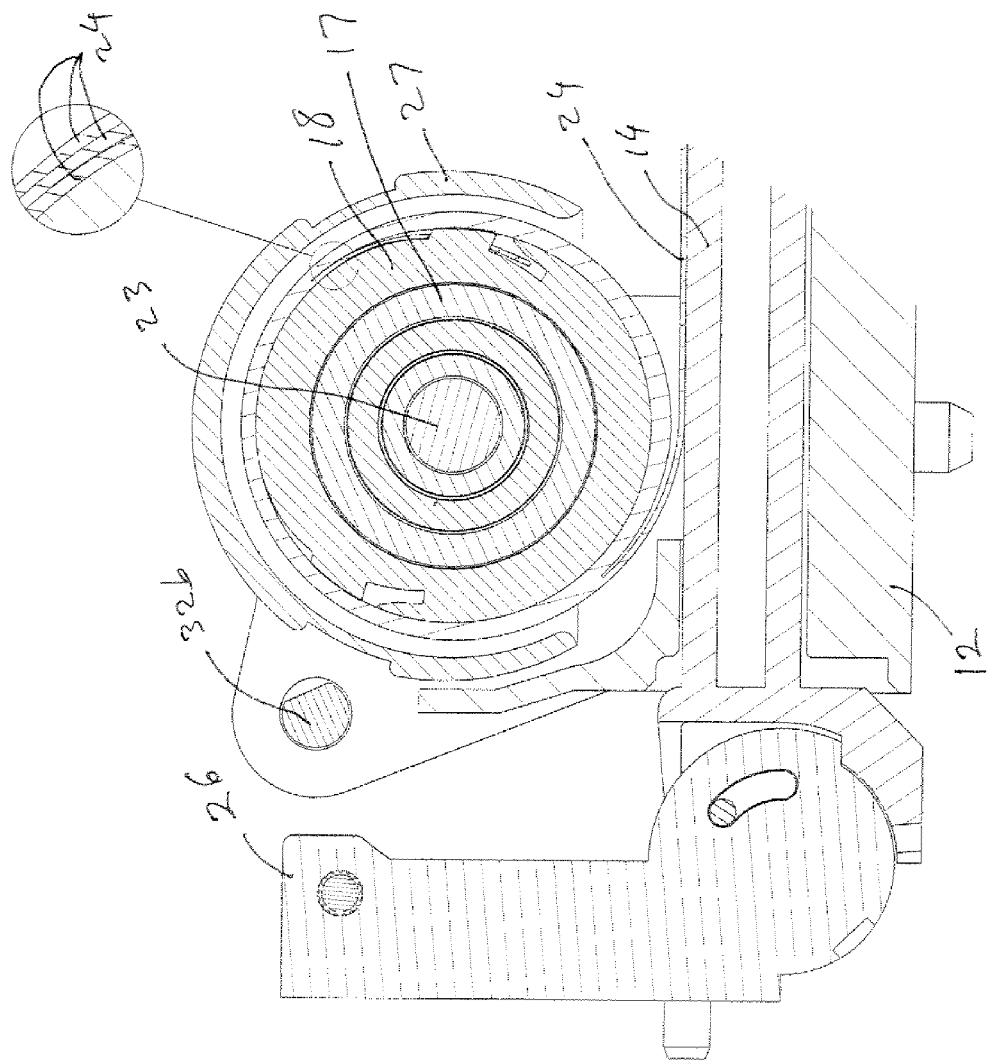
Figure 59:
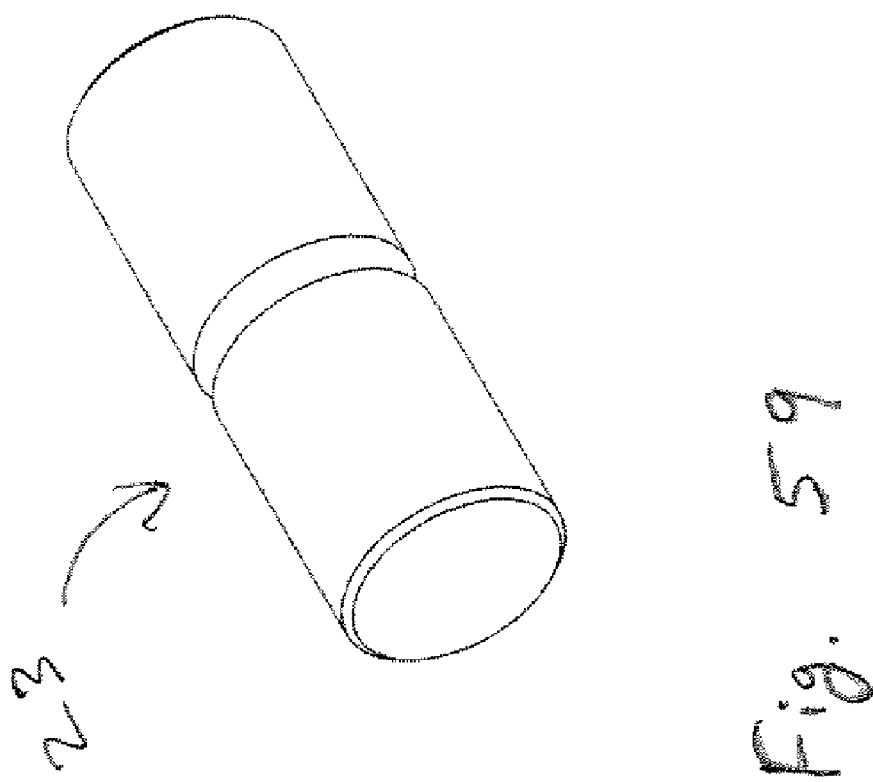
Figure 64:
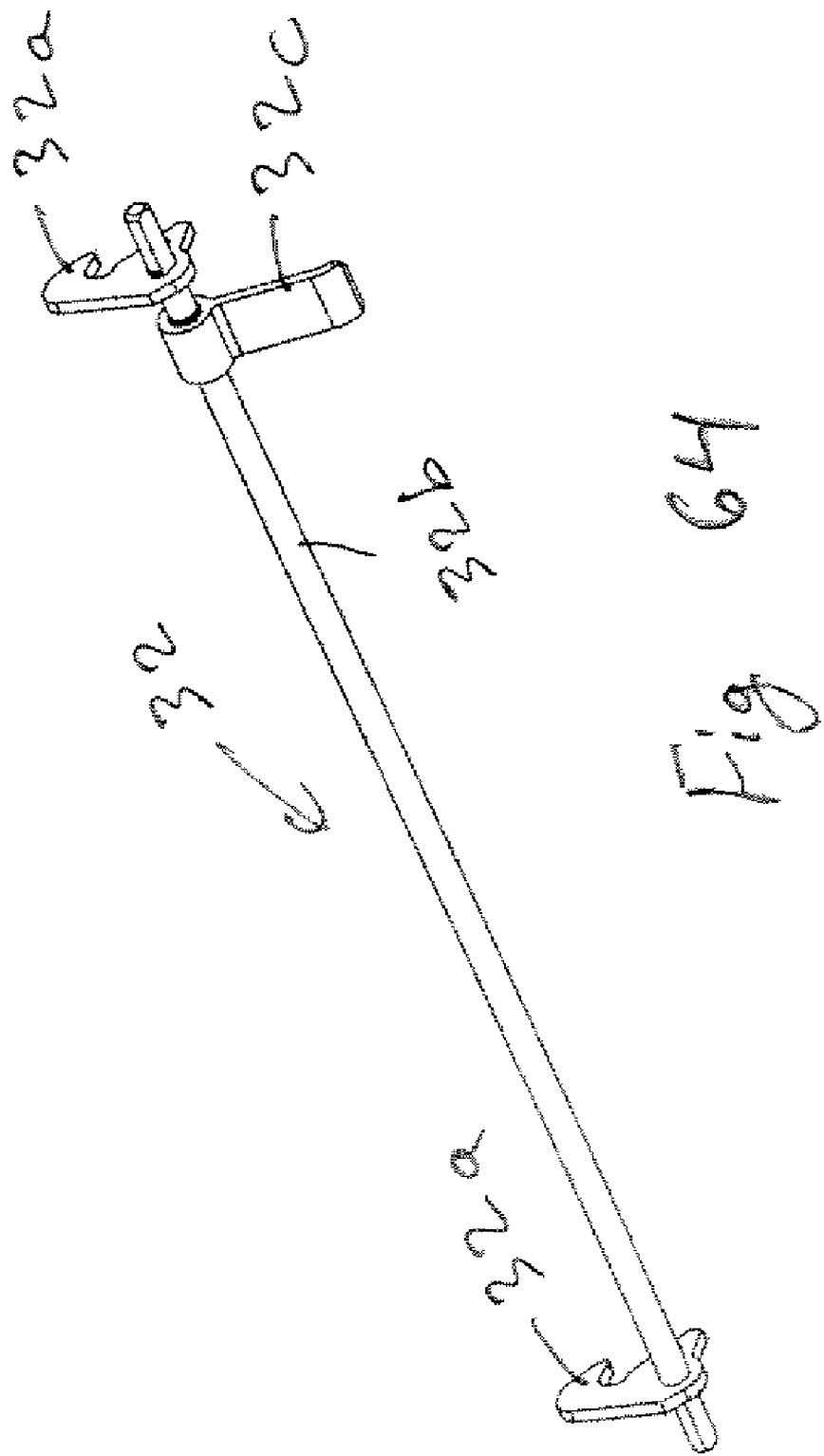
Figure 67:
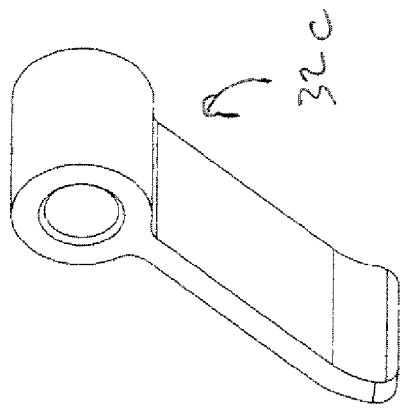
Figure 68:
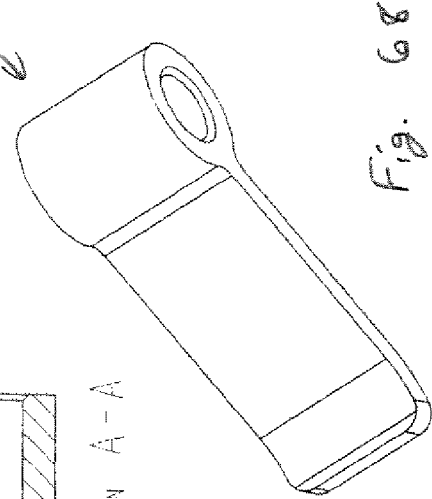
Figure 66:
Figure 65:
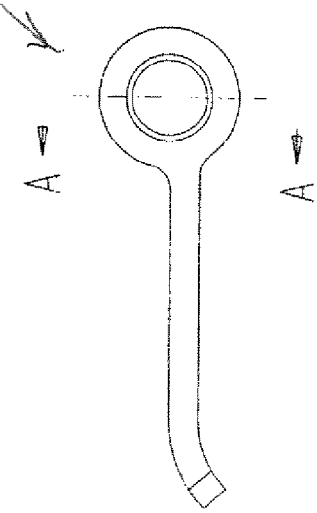
Figure 69:
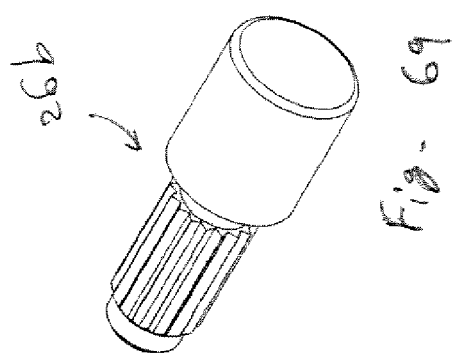
Figure 71:
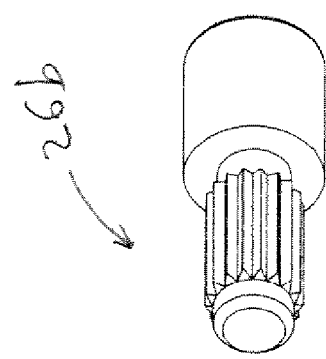
Figure 70:
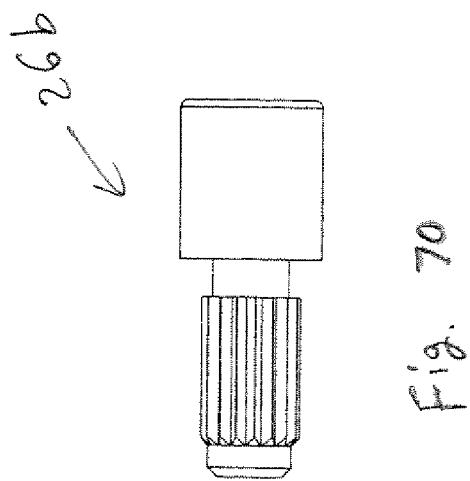
Figure 86:
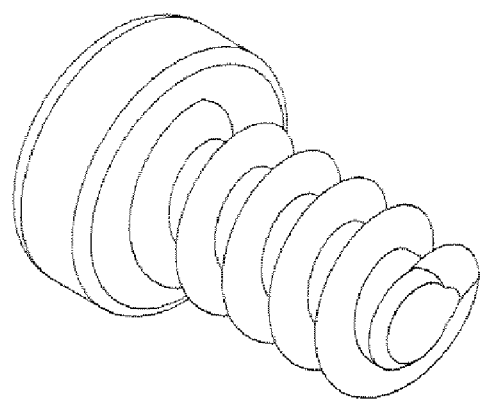
Figure 85:
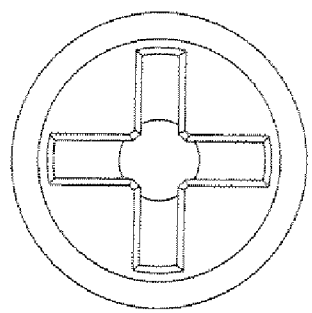
Figure 84:
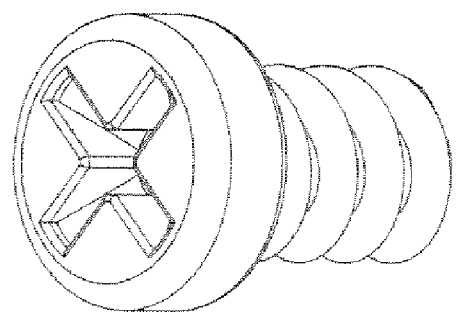
Figure 87:
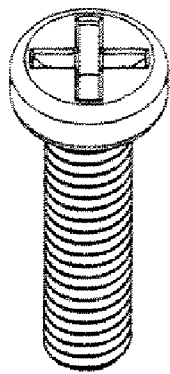

Certain terminology is used in the following description for convenience only and is not limiting. The words "right," "left," "upper," and "lower" designate directions in the drawings to which reference is made. The terminology includes the words above specifically mentioned, derivatives thereof, and words of similar import.

Figure 88:
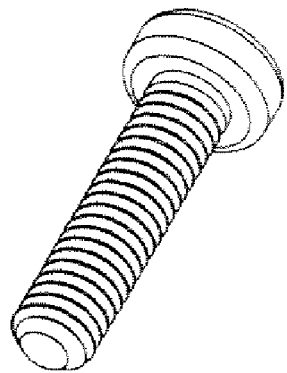

Referring to the drawings in detail, wherein like numerals indicate like elements throughout, there is shown in FIGS. 1-88 a first embodiment of a sliding and rotating hinge module, indicated generally at 10, in accordance with the present invention. The hinge module 10 includes fixed channel brackets 12 which are fastened to a vehicle (a portion 45 of the vehicle instrument panel is shown) or an object (not shown) in which the hinge module 10 is to be used. Preferably, there are two fixed brackets 12, although it is within the spirit and scope of the present invention that there be more or less than two fixed brackets 12. The two fixed brackets 12 are mounted to the vehicle or object so that the fixed brackets 12 are generally parallel to each other and similarly oriented such that fronts 12a of the fixed brackets 12 face in the same direction. Slidably mounted within each of the fixed brackets 12 is a slider 14. Preferably, each slider 14 slides outwardly in a direction of arrow A from the front 12a of the corresponding fixed bracket 12, the sliders 14 having a retracted position in which the majority of the sliders' 14 length is disposed within the fixed brackets 12 with only a front end 14a of each slider 14 extending outwardly from the front 12a of each fixed bracket 12, and an extended position in which the majority of the sliders' 14 length extends outwardly from the fronts 12a of the fixed brackets 12.

Referring to FIGS. 1-88, preferably, constant force springs 24 are fixed at one end to drums 18 that are rotationally supported by each fixed bracket 12, proximate the front 12a. The other end of each constant force spring 24 is attached to a respective one of the sliders 14. Preferably, the constant force springs 24 are flat spiral leaf springs. Each constant force spring 24 is biased to wrap around the respective drum 18 and the constant force spring 24 unwraps from the drum 18 as the slider 14 moves toward the retracted position. Thus, each constant force spring 24 biases the respective slider 14 toward the extended position. The constant force springs 24 apply a constant force to bias the sliders 14 outwardly from the fixed brackets 12. Each constant force spring 24 is in the form of a thin rectangular strip that is wrapped several times in a spiral around the respective drum 18 in the manner of a reel of tape. A damping mechanism 20 damps the rotational motion of each drum 18 relative to the respective bracket 12 for smooth, non-abrupt movement of the respective slider 14. Each damping mechanism 20 has a rotor formed by the respective drum 18 and a stator 17 that is held motionless relative to the respective bracket 12 near the front of the bracket 12a. Each stator 17 has an inner sleeve 11 and an outer sleeve 13. Each drum 18 has an inner sleeve 15 and an outer sleeve 19. The inner sleeve of the stator 17 is received in the inner sleeve of the drum 18. The inner sleeve of the stator 17 extends completely through the drum 18. The outer sleeve of the stator 17 is received between the inner and outer sleeves of the drum 18. Each constant force spring 24 wraps around the outer sleeve of the respective drum 18. Each stator and drum assembly is disposed between a pair of flanges at the front 12a of the respective bracket 12. A respective shaft 23 passes through the inner sleeve of the stator 17 and each of the pair of flanges at the front 12a of the respective bracket 12 to hold each stator and drum assembly between the pair of flanges at the front 12a of the respective bracket 12. Each stator 17 has two projections 21 that engage a groove 25 in one of the flanges at the front of the respective bracket 12 to thereby prevent relative rotation between the stator 17 and the respective bracket 12. The drum 18 can rotate relative to the respective stator 17 and the respective bracket 12. A damping grease is disposed between the opposing surfaces of the inner and outer sleeves of the drum 18 and the inner and outer sleeves of the stator 17 to damp the rotation of each drum 18 relative to the respective stator 17 and the respective bracket 12, and thus damp the motion of the respective slider 14 relative to the respective bracket 12 to thereby cause the sliders 14 to extend outwardly from the fixed brackets 12 with a generally constant, non-abrupt, and smooth motion.

In the illustrated embodiment, additional damping of the motion of the sliders 14 relative to the brackets 12 is provided by covers 27 that have outer sleeves that at least in part surround the outermost coil of each respective constant force spring 24. The outer sleeve of each cover 27 has an arc-shaped inside surface that defines the inside diameter surface of the cover 27 for engaging the outside diameter coils of the constant force springs 24. Each cover 27 at times frictionally engages the respective constant force spring 24 as it wraps around the respective drum 18 to further damp the linear motion of the of the sliders 14 relative to the brackets 12. The frictional engagement between the covers 27 and the constant force springs 24 usually occurs during the initial phase of the linear movement of the sliders 14 from the retracted position to the extended position. During this phase of the motion, the sliders 14 are moving too fast for the drum 18 to keep up with due to the action of the damping mechanisms 20. Accordingly, the constant force springs 24 expand radially outward relative to the drum 18 and frictionally engage the covers 27. This frictional engagement and the limiting of the radial expansion of the constant force springs 24 slows down and damps the linear motion of the sliders 14 during this initial phase. Each cover 27 is stationary relative to the respective bracket 12. Each cover 27 is disposed between the pair of flanges at the front 12a of the respective bracket 12. The respective shaft 23 also passes through the cover 27 to hold each cover 27 between the pair of flanges at the front 12a of the respective bracket 12. Each cover 27 has two projections 29 that engage a groove 31 in the flange opposite the flange of the respective bracket 12 that is engaged by the projections 21 of the stator 17, to thereby prevent relative rotation between the cover 27 and the respective bracket 12.

A drawer 16 is disposed between the sliders 14, and consequently between the fixed brackets 12, and is fixed to the sliders 14 to slide therewith. Preferably, the drawer 16 is generally U-shaped with the front ends 16a being fixed to the sliders 14 proximate the front ends 14a of the sliders 14. L-shaped ears 16b extend upwardly and outwardly from proximate the back of the drawer 16 and are attached to the sliders 14. The ears 16b effectively ride along top surfaces of the fixed brackets 12 to support the back of the drawer 16.

Preferably rotatably engaged with the front ends 14a of the sliders 14 are rotating arms 26. The rotating arms 26 rotate in a direction of arrow B from a first vertical position to a second position, which is pivoted outwardly from the hinge module 10. The rotating arms 26 are preferably biased toward the second position by torsion springs 28 disposed within the front ends 14a of the sliders 14. Preferably, the rotating arms 26 are attached to the front ends 14a by cylinder-within cylinder joints having damping grease disposed between the closely spaced surfaces of the rotating arms 26 and the front ends 14a to achieve damped rotation of the rotating arms 26.

In the illustrated example, the front ends 14a of the sliders 14 are provided with cylindrical cavities having an inner sleeve 33 and an outer wall 35. Each of the arms 26 is provided with a cylindrical cavity at one end that has an inner post 37 and an outer wall 39. The inner post 37 of each arm 26 is received within the inner sleeve 33 of the respective slider 14. The outer wall 39 of each arm 26 is received within the outer wall 35 of the respective slider 14. The coils of each torsion spring 28 are housed between the inner sleeve 33 of the respective slider 14 and the outer wall 39 of the respective arm 26. Axially projecting tails of each torsion spring 28 engage a hole in the cylindrical cavity of the slider 14 and a hole in the cylindrical cavity of the arm 26, respectively, in order to bias the respective arm 26 toward the second or deployed position. Viscous damping of the rotation of the arms 26 relative to their respective sliders 14 is provided by damping grease disposed between the closely spaced surfaces of the outer wall 39 of each arm 26 and the outer wall 35 of the respective slider 14, and between the closely spaced surfaces of the inner post 37 of each arm 26 and the inner sleeve 33 of the respective slider 14.

Although this configuration is preferred, it is within the spirit and scope of the present invention that different configurations be used, provided that they can perform in the manner described herein. A protrusion 26b preferably extends inwardly from a side of each rotating arm 26. A display screen (not shown) or other object (not shown) is intended to be attached to the rotating arms 26 to rotate therewith.

Preferably, the hinge module 10 has at least a stowed position in which the sliders 14 are in the retracted position and the rotating arms 26 are in the first position and a deployed position in which the sliders 14 are in the extended position and the rotating arms 26 are in the second position. The constant force springs 24 and the torsion springs 28 bias the hinge module 10 in the deployed position.

A latch 32 is preferably used to retain the hinge module 10 in the stowed position. The latch 32 preferably includes a hook 32a rotatably mounted to the front 12a of each fixed bracket 12, preferably proximate tops thereof, to engage the protrusion 26b of each rotating arm 26 in order to retain the hinge module 10 in the stowed position. The hooks 32a are preferably rotatably coupled by a shaft 32b extending between the hooks 32a in a direction generally perpendicular to the fixed brackets 12. A tab 32c is preferably fixed to the shaft 32b. In this way, manipulation of the tab 32c causes rotation of the shaft 32b and, consequently, the hooks 32a to release the protrusions 26b of the rotating arms 26 in order to release the hinge module 10 from the stowed position. Torsion spring 32d biases the hooks 32a toward engagement with protrusions 26b. Preferably, an interface (not shown), such as a button (not shown) or lever (not shown), which is accessible to a user within the vehicle, is coupled to the tab 32c so that pushing of the button or rotating of the lever causes rotation of the tab 32c. In this way, the user can release the hinge module 10. Although the latch 32 discussed above is preferred, it is within the spirit and scope of the present invention that another device be used with the hinge module 10, provided it is capable of functioning to retain the hinge module 10 in the stowed position.

Preferably, the above-discussed components of the hinge module 10 are formed from one of a polymeric material and a metallic material. The fixed brackets 12 and the rotating arms 26 may be made of die cast metal, such as, but not limited to zinc. Preferably, the constant force springs 24, and the arm springs 28 are made of metal, such as, but not limited to, stainless steel for the constant force springs 24 and music wire for the arm springs 28. It is preferable that the drawer 16, the hooks 32a, the shaft 32b, and the tab 32c are also made of metal, such as, but not limited to, zinc plated steel for the drawer 16, the hooks 32a, and the tab 32c and nickel plated steel for the shaft 32b. Lastly, it is preferably that the sliders 14 are made of a polymeric material, such as, but not limited to, a plastic such as glass filled Delrin, for instance, although it is possible to make the sliders 14 out of a metal such as die cast zinc, if desired. Although these materials are preferred, it is within the spirit and scope of the present invention that the components be made of different materials, provided the components can still function in the manner described herein.

In use, the hinge module 10 is preferably disposed within a motor vehicle for use with an in-dash navigation system (not shown). The fixed brackets 12 are fixed to and disposed substantially within a dashboard (not shown) of the vehicle and the display screen of the navigation system is attached to the rotating arms 26. During normal operation, the hinge module 10 is kept in the stowed position so that the display screen is substantially vertically oriented and flush with the front of the dashboard. When the user wishes to open the hinge module 10 (to change a data disk (not shown) within the navigation system, for instance), the user actuates the interface button or lever to unlatch the latch 32. The sliders 14 are then automatically pushed outwardly in the direction of arrow A toward the extended position by the constant force springs 24, in turn sliding the drawer 16 outwardly. At this point, the sliders 14 and the drawer 16 continue sliding in the outward direction, while the rotating arms 26 are able to rotate in the direction of arrow B from the first position, where the display screen 47 is approximately perpendicular to the sliders 14, to the second position to place the display screen in an orientation that is approximately parallel to the sliders 14, thereby placing the hinge module 10 in the deployed position and allowing access to the navigation system by the user. To place the hinge module 10 back into the stowed position, the user applies force to the display screen to rotate the rotating arms 26 back to the first position and then push the sliders 14 into the retracted position, allowing the latch 32 to re-engage the protrusions 26b of the rotating arms 26 and retain the hinge module 10 in the stowed position.

In this way, the hinge module 10 provides relatively constant sliding motion along with relatively constant rotating motion when moving from the stowed position to the deployed position without the use of a motor. It is important to note that, although described with respect to a navigation system, the hinge module 10 can be used in any application in which such sliding motion in combination with rotating motion is desired.

The present invention has the advantage that the damping grease will not be wiped from the damping surfaces as is the case with linear dampers, which would lead to a loss of damping effectiveness. Also, the user and the electronics supported by the hinge module 10 are shielded from the damping grease, which can soil skin and clothing or damage sensitive electronics.

One end of the constant force spring 24 is fastened to the drum 18 with a molded feature, namely pin 41, and this end is also inserted into a slot (also this connection could be accomplished using a structural adhesive tape) on the rotor or drum 18. Another method to couple the linear motion of the slider to the damper would be the incorporation of a gear rack and pinion design to be integrated to the slider and rotary damper.

Anchoring the inner end of constant force spring 24 to the drum 18 in the illustrated embodiment is important due to the inherent friction differential between the slider 14's free linear travel and the controlled rotary motion of the damper rotor or drum 18. The friction force differential between the drum 18 and the slider 14 causes the potential energy stored in the constant force spring 24 when stowed, to equalize when the assembly is activated. This equalization for friction forces (release of potential energy to kinetic energy due to the constant force spring 24) results in the outside diameter of the constant force spring 24 to increase (coil separation) until equilibrium is established with the axial motion of the slider 14 and the rotary motion of the drum 18.

The uncoiling of the constant force spring is undesirable due to the limited space within the customer's electronic assembly, or the potential of the metallic spring contacting electronic circuitry. To resolve the constant force spring uncoiling and to prevent the potential contact with the electronic circuitry, the polymeric cover 27 was devised to constrain the un-coiling of the constant force spring 24. This cover also provides an added benefit of additional damping of the assembly due to the friction generated by outside diameter coils of the constant force spring 24 contacting the inside diameter surface of the polymeric cover 27 as the spring wraps around the drum 18. This additional system friction is desirable to enable the fine tuning of the total damping of the assembly linear travel. This tuning of the damped linear motion is desirable to improve the product function and cycle life. The damping rate can be adjusted by increasing or decreasing the clearances, rotational surface area, damping fluid viscosity, or addition of one or more radial sealing elements, e.g. an o-rings.

The damping motion is applied to the axial motion of the slider 14 as follows; The hook 32a is disengaged from the arm 26 by the activation of the release mechanism by the user. This releases the energy stored in the constant force springs 24 to translate the sliders 14 outward to the extended state. The spring coiling forces cause equalization (the spring shape changes) to occur by the spring outside diameter coils growing to the limit of the cover 27's inside diameter (this causes an initial surge of the slider outward until equalization of the constant force spring 24 and is only slightly noticeable). The linear travel system friction forces are then equalized and the damper restricts the linear motion (constant velocity) outward to the extended and deployed position, while the arms 26 rotate the display forward to the deployed position.

The hinge assembly uses a torsion spring 28 to store the rotation energy required to initiate the rotation movement of the display panel when activated. The close diameter fit of the arm 26 surfaces to the slider 14 with the void filled with damping fluid (e.g. high viscosity damping grease) damps the rotational motion of the arms 26. Constraining the rotation of the arms 26 and attachment of the arms 26 to the sliders is preferably accomplished by the addition of snap-fit tab geometry on the slider 14 and a flange 43 added to the arm 26. A radial seal, e.g. o-ring, could be added to the arm/slider hinge pivot to improve the retention of the damping fluid and to add additional friction force, if desired.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

The invention claimed is:
1. A sliding and rotating hinge module comprising:
at least one bracket adapted for fastening to a vehicle;
a slider mounted within said bracket and supported for sliding movement relative to said bracket between a retracted position and an extended position;

a drum rotationally supported by said bracket;
a constant force spring attached to said drum at one end and said slider at another end, said constant force spring being biased to wrap around said drum, said constant force spring unwrapping from said drum as said slider moves toward said retracted position, and said constant force spring biasing said slider toward said extended position;
a damping mechanism for damping rotational motion of said drum relative to said bracket;
a support member pivotally attached to the slider, said support member being pivotally movable relative to said slider between a first position and a second position at least when said slider is in said extended position;
a latch provided for selectively holding said slider in said retracted position; and
a cover attached to said bracket and having an outer sleeve provided with an arc-shaped inside surface that at least in part surrounds an outermost coil of said constant force spring, such that when said slider is moving too fast for said drum to keep up with and results in the constant force spring expanding radially outward relative to the drum to engage said cover, said cover limits outward radial expansion of said constant force spring to slow down said sliding movement of said slider toward said extended position.

2. The sliding and rotating hinge module according to claim 1, wherein said latch is capable of engaging said support member in order to hold said slider in said retracted position.

3. The sliding and rotating hinge module according to claim 2, wherein said support member is spring biased toward said second position relative to said slider.

4. The sliding and rotating hinge module according to any one of claims 1 through 3, further comprising:
damping means for damping pivotal movement of said support member relative to said slider.

5. The sliding and rotating hinge module according to any one of claims 1 and 3, wherein said latch engages said support member to maintain said slider in said retracted position and said support member in said first position.

6. The sliding and rotating hinge module according to claim 2, wherein said latch also maintains said support member in said first position when said latch is engaging said support member.

7. A sliding and rotating hinge module comprising:
at least one bracket adapted for fastening to a vehicle;
a slider mounted within said bracket and supported for sliding movement relative to said bracket between a retracted position and an extended position;
a drum rotationally supported by said bracket;
a constant force spring attached to said drum at one end and said slider at another end, said constant force spring being biased to wrap around said drum, said constant force spring unwrapping from said drum as said slider moves toward said retracted position, and said constant force spring biasing said slider toward said extended position;
a damping mechanism for damping rotational motion of said drum relative to said bracket, said damping mechanism for damping rotational motion of said drum comprising a stator provided in a fixed position relative to said bracket, at least an inner stator sleeve and an outer stator sleeve provided as part of said stator, and at least an inner drum sleeve and an outer drum sleeve provided as part of said drum, wherein said inner sleeve of said stator is received in said inner sleeve of said drum, said outer sleeve of said stator is received between said inner sleeve of said drum and said outer sleeve of said drum to form opposing surfaces of said inner and outer sleeves of said drum and said inner and outer sleeves of said stator, and wherein said damping mechanism for damping rotational motion of said drum further comprises a damping grease disposed between said opposing surfaces of said inner and outer sleeves of said drum and said inner and outer sleeves of said stator to dampen rotational motion of said drum relative to said bracket;
a support member pivotally attached to the slider, said support member being pivotally movable relative to said slider between a first position and a second position at least when said slider is in said extended position;
a latch provided for selectively holding said slider in said retracted position; and
a cover attached to said bracket and having an outer sleeve provided with an arc-shaped inside surface that at least in part surrounds an outermost coil of said constant force spring, such that when said slider is moving too fast for said drum to keep up with and results in the constant force spring expanding radially outward relative to the drum to engage said cover, said cover limits outward radial expansion of said constant force spring to slow down said sliding movement of said slider toward said extended position.

8. The sliding and rotating hinge module according to claim 7, further comprising:
damping means for damping pivotal movement of said support member relative to said slider.

9. The sliding and rotating hinge module according to claim 8, wherein said support member is spring biased toward said second position relative to said slider.

10. The sliding and rotating hinge module according to claim 9, wherein said latch engages said support member to maintain said slider in said retracted position and said support member in said first position.

11. The sliding and rotating hinge module according to claim 10, wherein said slider has a front end and wherein said damping means for damping pivotal movement of said support member comprises:
a cylindrical cavity having an inner sleeve and an outer wall provided at said front end of said slider;
a cylindrical cavity having an inner post and an outer wall provided at one end of said support member, said inner post of said support member being received within said inner sleeve of said cavity of said slider, said outer wall of said cavity of said support member being received within said outer wall of said cavity of said slider; and
damping grease disposed between closely spaced surfaces of said outer wall of said cavity of said support member and said outer wall of said cavity of said slider, and between closely spaced surfaces of said inner post of said cavity of said support member and said inner sleeve of said cavity of said slider, to thereby damp pivotal movement of said support member relative to said slider.

12. The sliding and rotating hinge module according to claim 4, wherein said slider has a front end and wherein said damping means for damping pivotal movement of said support member comprises:
a cylindrical cavity having an inner sleeve and an outer wall provided at said front end of said slider;
a cylindrical cavity having an inner post and an outer wall provided at one end of said support member, said inner post of said support member being received within said inner sleeve of said cavity of said slider, said outer wall of said cavity of said support member being received within said outer wall of said cavity of said slider; and damping grease disposed between closely spaced surfaces of said outer wall of said cavity of said support member and said outer wall of said cavity of said slider, and between closely spaced surfaces of said inner post of said cavity of said support member and said inner sleeve of said cavity of said slider, to thereby damp pivotal movement of said support member relative to said slider.

13. The sliding and rotating hinge module according to claim 1, wherein said damping mechanism for damping rotational motion of said drum comprises a stator provided in a fixed position relative to said bracket, at least one stator sleeve provided as part of said stator, and at least one drum sleeve provided as part of said drum, wherein said stator sleeve fits into said drum sleeve, and wherein said damping mechanism for damping rotational motion of said drum further comprises a damping grease disposed between said stator sleeve and said drum sleeve to dampen rotational motion of said drum relative to said bracket.

* * * * *